US010095302B2

(12) United States Patent
Gur et al.

(10) Patent No.: US 10,095,302 B2
(45) Date of Patent: Oct. 9, 2018

(54) METHOD AND APPARATUS FOR AUTOMATIC ADAPTIVE VOLTAGE CONTROL

(71) Applicant: Intel Corporation, Santa Clara, CA (US)

(72) Inventors: Ariel Gur, Haifa (IL); Daniel J Ragland, Hillsboro, OR (US); Ofer Nathan, Kiryat Yam (IL); Nadav Shulman, Tel Mond (IL); Esfir Natanzon, Haifa (IL)

(73) Assignee: Intel Corporation, Santa Clara, CA (US)

( * ) Notice: Subject to any disclaimer, the term of this patent is extended or adjusted under 35 U.S.C. 154(b) by 88 days.

(21) Appl. No.: 15/250,123

(22) Filed: Aug. 29, 2016

(65) Prior Publication Data
US 2018/0059763 A1 Mar. 1, 2018

(51) Int. Cl.
*G06F 1/32* (2006.01)
(52) U.S. Cl.
CPC ................... *G06F 1/324* (2013.01)
(58) Field of Classification Search
CPC ..... G06F 1/12; G06F 1/14; G06F 1/10; G06F 5/06; G06F 13/1689; G06F 1/08; G06F 1/04; G06F 1/3202; G06F 9/4825; G06F 11/0757; G06F 11/3419; G11C 7/22
See application file for complete search history.

(56) References Cited

U.S. PATENT DOCUMENTS

| 7,562,233 B1* | 7/2009 | Sheng ................... G06F 1/3203 327/534 |
| 7,774,625 B1* | 8/2010 | Sheng ................... G06F 1/3203 365/227 |
| 2004/0128566 A1* | 7/2004 | Burr ....................... G06F 1/3203 713/300 |
| 2004/0128567 A1* | 7/2004 | Stewart ................. G06F 1/3203 713/300 |
| 2008/0122421 A1 | 5/2008 | Hsieh et al. |
| 2010/0169609 A1* | 7/2010 | Finkelstein ........... G06F 1/3203 712/43 |
| 2012/0216058 A1 | 8/2012 | Wells et al. |
| 2013/0067250 A1 | 3/2013 | Wu et al. |
| 2015/0006915 A1* | 1/2015 | Ganesan ................... G06F 1/26 713/300 |
| 2016/0103473 A1 | 4/2016 | Tani |

OTHER PUBLICATIONS

PCT Notification of Transmittal of the International Search Report and the Written Opinion of the International Searching Authority for PCT Application PCT/US2017/044240, dated Nov. 7, 2017, 15 pages.

* cited by examiner

*Primary Examiner* — Zahid Choudhury
(74) *Attorney, Agent, or Firm* — Lowenstein Sandler LLP

(57) ABSTRACT

A processing device includes a power management unit to receive a base clock (BCLK) frequency rate to be applied to the processing device; and to determine, using a reference voltage/frequency curve, a voltage corresponding to the BCLK frequency rate, wherein the reference V/F curve is generated based on a reference BCLK frequency rate of the processing device.

14 Claims, 14 Drawing Sheets

230

METHOD AND APPARATUS FOR AUTOMATIC ADAPTIVE VOLTAGE CONTROL

TECHNICAL FIELD

The implementations of the disclosure relate generally to processing devices and, more specifically, relate to a method and apparatus to provide automatic adaptive voltage control in a processing device.

BACKGROUND

Increasing the performance of a computer system may be accomplished through the use of "overclocking." A processing unit manufacture may establish a default base clock (BCLK) rate based on the physical limitations of the processing unit. This default BCLK rate provides a consistent time period used throughout the processor unit and determines the rate that operations are performed by the processing unit. Overclocking involves increasing the BCLK frequency above a default BCLK frequency based on the default BCLK rate in order to run the processing unit at a higher speed.

BRIEF DESCRIPTION OF THE DRAWINGS

The disclosure will be understood more fully from the detailed description given below and from the accompanying drawings of various implementations of the disclosure. The drawings, however, should not be taken to limit the disclosure to the specific implementations, but are for explanation and understanding only.

DETAILED DESCRIPTION

Disclosed herein are implementations for providing power management unit adaptive to base clock overclocking in a computer system (which may be referred to herein as "system"). Overclocking refers to increasing a BCLK frequency of a processing unit (also referred to herein as a "processor" or "processing device") above a default BCLK frequency based on a default BCLK frequency rate (e.g., rate at which operations are performed on the processor) in order to run the processing unit at a BCLK frequency rate that is higher than the default BCLK frequency rate.

Currently, voltage calculations are based on a phase locked loop (PLL) ratio (which may also be known as a frequency multiplier), which can result in an incorrect (lower) voltage when the BCLK frequency is changed during overclocking. The PLL ratio measures ratios of an internal CPU clock rate to an externally supplied clock, and multiplies by a number of cycles of the CPU for every external clock cycle. One conventional approach to accommodate overclock frequency is to set a fixed voltage, which is generally a high voltage and does not change when the processor switches from one frequency to another. However, by setting a fixed high voltage regardless of the actual frequency, the processor remains at a high voltage level for a long period of time, which is inefficient for the processor. Another conventional approach to accommodate overclock frequency is to use a voltage offset. However, it is difficult and inefficient to calculate the voltage offset as it is a trial and error use case to measure many different voltages used by the processor.

Implementations of the disclosure alleviate the above-noted and other deficiencies by implementing a power management unit in a system on a chip (SoC) device. In one implementation, the power management unit continuously receives a BCLK frequency and determines a difference between the BCLK frequency with a reference BCLK frequency in a reference voltage(V)/frequency (F) curve. When the difference is determined to exceed a threshold, the power management unit calculates a voltage for each of the frequencies. Accordingly, the power management unit computes a new V/F curve based on the received BCLK frequency and the reference V/F curve. The processor is modified to operate using the voltage generated for the received BCLK frequency using the new V/F curve. In the new V/F curve, the voltages are scaled down when workloads of the processor are low or the processor is experiencing periods of idle time, which improves the reliability and performance of the processor. As such, implementation of the disclosure simplify the use of BCLK frequencies, which are different from the reference BCLK frequency, without sacrificing power efficiency and without hastening unnecessary aging of the processor.

Figure 1:
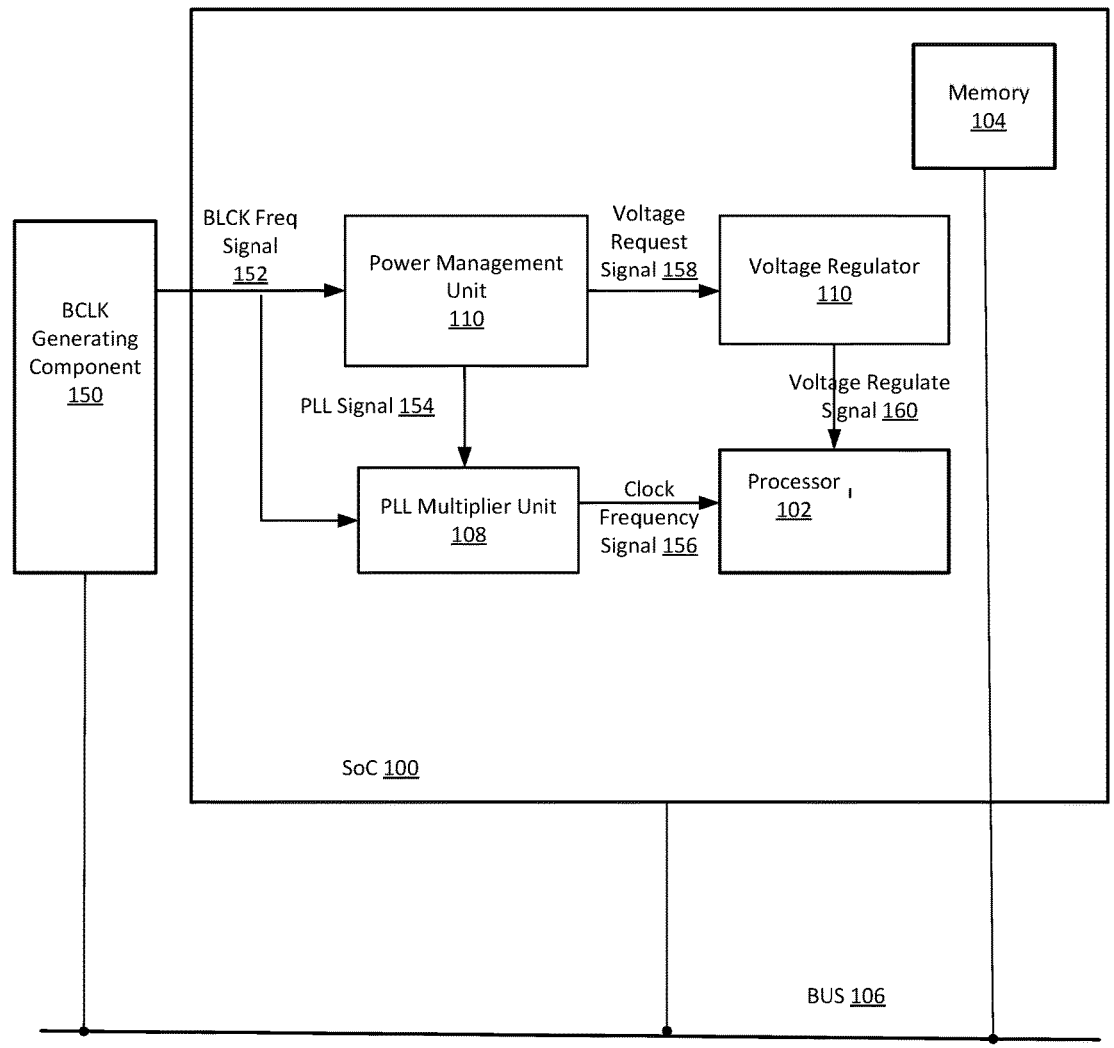
FIG. 1 illustrates a block diagram of system on a chip (SoC) including a processing system that implements a power unit according to an implementation of the disclosure.

FIG. 1 illustrates a system-on-a-chip (SoC) 100 including a processing system according to an implementation of the disclosure. The SoC 100 may include a functional unit (such as a central processing unit (CPU)) or a processor 102 and a memory 104 connected to each other via a bus system interface 106. The processor 102 may execute tasks for system applications and user applications using a memory 104 to store the instructions and data associated with programs for executing the tasks for the system applications and user applications. The processor 102 may include one or more processors or processing units (e.g., processing cores or cores), each of which may execute its own separate tasks.

The SoC 100 may also include a power management unit 110 and a phase locked loop (PLL) both of which are coupled to a BCLK generating component 150 via the bus system interface 106. In one implementation, the power management unit 110 is a power control unit. The BCLK generating component 150 may include one or more timing devices used to control base clock frequency sent to various components of processor 102. In one implementation, the BCLK generating component 150 may generate different BCLK frequencies for different groups of components, including generating different (independent) BCLK frequencies for the various processing cores of the processor 102.

In one implementation, the BCLK generating component 150 generates a continuous BCLK frequency signal 152, which includes a BCLK frequency rate. The BCLK frequency rate in the BCLK frequency signal 152 may support the overclocking. In one implementation, the PLL multiplier unit 108 and the power management unit 110 receive the BCLK frequency signal 152. The power management unit 110 generates a PLL signal 154. The PLL signal 154 is a PLL ratio, which measures a ratio of each of the BCLK frequencies of the processor 102 with the BCLK frequency rate in the BCLK frequency signal 152. In one implementation, the BCLK frequency rate is a default BCLK frequency rate. The default BCLK frequency rate is one factor in determining a processor core's frequency. The processor clock frequency is based on an integer ratio value multiplied by the BCLK frequency. In one implementation, the default BCLK frequency rate is a user-defined value. The default BCLK frequency rate may be specified in software or programmed into the processor. The default BCLK frequency rate may be specified in MHz or fractions of MHz. In one implementation, the default BCLK frequency rate may be specified at initialization, however, it can be changed both on resets and live in the operating system.

In one implementation, the power management unit 110 compares value of the BCLK frequency rate in the BCLK frequency signal 152 with a default BCLK frequency rate. In one implementation a reference V/F curve is calculated for the reference BCLK frequency rate of the processor 102 using several different pairs of BCLK frequencies, measured in Megahertz (MHz) and reference voltages (measured in Volts), and defined as reference values to the reference V/F curve. In one implementation, the reference BCLK frequencies are selected in a value ranging from a lower value to a higher value. In one implementation, corresponding reference voltages are determined in a value ranging from a lower value to higher value. In one implementation, the reference voltages are calculated during manufacturing of the processor by running a test content on the CPU using various frequencies and voltages covering the minimum, maximum, and intermediate values of the frequencies. In one implementation, data is interpolated for the remaining BCLK frequencies (i.e., that were not selected as reference BCLK frequencies) to compute the reference V/F curve, which is described in further detail below.

In one implementation, the power management unit 110 determines a voltage value for each of the BCLK frequencies in the BCLK frequency signal 152. In one implementation, the power management unit 110 determines the voltage value for the BCLK frequency based on the PLL ratio in the PLL signal 154, an array of voltages (in ascending order) retrieved from the V/F curve, and the BCLK frequency rate in the BCLK frequency signal 152.

As discussed above, the PLL multiplier component 108 is also communicably coupled to the power management unit to receive the PLL signal 154, which includes the PLL ratio. In one implementation, the PLL multiplier component 108 determines a BCLK frequency of the processor 102 based on the PLL ratio received from the power management unit 110 and the BCLK frequency rate in the BCLK frequency signal 152. The PLL multiplier component 108 multiplies the PLL ratio with the BCLK frequency rate to compute the BCLK frequency of the processor 102. The PLL multiplier component 108 sends a clock frequency signal 156 including the BCLK frequency to the processor 102.

In one implementation, the PLL ratio in the PLL signal 154 includes a minimum PLL ratio value and a maximum PLL ratio value for the reference BCLK frequencies in the reference V/F curve. In one implementation, a PLL ratio range includes the minimum PLL ratio value and values greater than the minimum PLL ratio value but less than the maximum PLL ratio value. The power management unit 110 iterates through BCLK frequency ranges of the reference V/F curve, except the last frequency value in the frequency range, to determine an index value in PLL ratio of frequency multipliers in ascending order. Accordingly, the power management unit 110 iterates the PLL signal 154 through the PLL multiplier unit 108 and thus iterates over all possible BCLK frequencies that is achieved as long as the resulting BCLK frequency is lower than the maximum BCLK frequency. In one implementation, this index value remains the same as long as the BCLK frequency value is within a range defined by two different BCLK frequency reference values on the reference V/F curve. In one implementation, this index value changes for a BCLK frequency value that falls outside the range defined by the two different BCLK frequency reference values. The V/F curve is a piecewise linear graph and an algorithm (as discussed in detail below) determines which line/segment in the reference V/F curve (that is built using 100 MHz BCLK as discussed below) holds the requested frequency. The segment number represents the index value.

The power management unit 110 also determines a base frequency for each of the reference frequency ranges by multiplying the index value with the BCLK frequency value. In one implementation, this base frequency remains the same as long as the BCLK frequency value is within a range defined by two different frequency reference values on the reference V/F curve. In one implementation, this base frequency changes for a BCLK frequency value that falls outside the range defined by the two different BCLK frequency reference values.

The power management unit 110 determines Voltage step/delta (Vstep) per the reference BCLK frequency rate for a voltage range. The value of a voltage range is determined by subtracting two different reference voltages (minimum and maximum voltage values) in the reference V/F curve. The Vstep is determined by dividing a value of the voltage range with a value in the PLL ratio range. The value in the PLL ratio range is determined by subtracting two different PLL ratios values associated with corresponding BCLK frequencies. As discussed above, the PLL ratios of the BCLK frequencies may be pre-determined values specified by a user. In one implementation, this Vstep remains the same as long as the BCLK frequency value is in a range defined by two different frequency reference values. In one implementation, this Vstep changes for a BCLK frequency value that falls outside the range defined by the two different frequency reference values.

The power management unit 110 determines a base voltage for each of the reference voltage ranges. In one implementation, the base voltage is the lower voltage value in the voltage range. In one implementation, this base voltage remains the same as long as the BCLK frequency value is in within a range of defined by two different frequency reference values on the reference V/F curve. In one implementation, this base voltage changes for a BCLK frequency value that falls outside the range defined by two different BCLK frequency reference values. The power management unit 110 determines a voltage value for the BCLK frequency. The voltage value for the BCLK frequency is determined by adding a base voltage to a binary operation. The binary operation includes subtracting base frequency from BCLK frequency to obtain a delta frequency, which is divided by the reference BCLK frequency rate having a value, for example, 100 and multiplied by Vstep. As such, a voltage value is generated for the BCLK frequency rate in the BCLK frequency signal 152 for a processor. This voltage value is different for each of the different BCLK frequencies in the processor. The process described above is repeated by the power management unit 110 for different BCLK frequencies to create a new V/F curve 202 up to and including the maximum PLL ratio value, thus generating a new V/F curve for the BCLK frequency rate in the BCLK frequency signal 152.

In one implementation, a process implemented by the power management unit 110 may be represented according to the following pseudo code. An input to the power management unit 110 is V[n], R [n], and BCLK. V[n] is an array of voltages in ascending order, R[n], an array of n PLL (frequency multipliers) ratios in ascending order and BCLK is the BCLK frequency. The constants minimum PLL ratio, minR=R[1], and maximum PLL ratio, maxR=R[n] are derived from the input to the power management unit 110. An output of the power management unit 110 is a Voltage, Vout[maxR], corresponding to the BCLK for the processor.

```
ratio = minR
freq = ratio * BCLK
# iterate over the ranges excluding the last point
For index in [1, n-1]
    # find the base frequency for this range
    baseF = R[index] * BCLK
    nextBaseF = R[index +1] * BCLK
    # Find voltage step/delta per 100MHz
    vStep = (V[index +1] - V[index]) / (R[index +1] - R[index])
    # find the base voltage for this range
    baseV = V[index]
    # Find new voltages as long as the frequency belongs to the range
    while (freq < nextBaseF)
        # Difference between current frequency and the base
        deltaF = freq - baseF
        # The new voltage is the linear interpolation between the base
        voltage and the base voltage of the next range
        Vout[ratio] = baseV + (deltaF / 100) * vStep
        ratio = ratio + 1
        freq = freq + BCLK
# fill the rest of V/F curve with the max voltage
# extend the V/F curve to handle very high frequencies
# Example - V/F curve is defined for ratios 8-30 but the processor
#   can support up to 100. For ratios 31-100, the voltage used is the
#   same as ratio 30
While ratio <= maxR
    Vout[ratio] = V[n]
```

The above process may be repeated by the power management unit 110 for different BCLK rates to compute a new V/F curve for each of the processors 102 to run the operations at their corresponding BCLK rate.

Table 1 presented below illustrates an example of a reference V/F curve for different BCLK frequency values using a BCLK rate of 100 MHz. As shown, in Table 1 below, input PLL ratio includes four values, 8, 16, 32, and 40, corresponding computed BCLK frequencies include four values, 800 MHz, 1600 MHz, 3200 MHz and 4000 MHz, and corresponding computed voltage values include four values 0.6V, 0.7V, 0.95V and 1.2V. In one implementation, data is interpolated for the remaining BCLK frequencies that were not BCLK frequencies in the 800 MHz to 4,000 MHz range in order to compute another reference V/F curve, as is described in further detail below with respect to Table 2 below.

TABLE 1

BCLK rate 100

| PLL Ratio | BCLK Freq (MHz) | Voltage (V) | V step | Freq w/BCLK | V step w/BCLK |
|---|---|---|---|---|---|
| 8 | 800 | 0.6 | 0.0125 | 800 | 0.0125 |
| 16 | 1600 | 0.7 | 0.015625 | 1600 | 0.015625 |
| 32 | 3200 | 0.95 | 0.03125 | 3200 | 0.03125 |
| 40 | 4000 | 1.2 | 0 | 4000 | 0 |

TABLE 2

Reference V/F curve calculation

| PLL Ratio | BCLK Freq | index in ratio | base F | V step | Base V | Voltage |
|---|---|---|---|---|---|---|
| 8 | 800 | 1 | 800 | 0.0125 | 0.6 | 0.6 |
| 9 | 900 | 1 | 800 | 0.0125 | 0.6 | 0.6125 |
| 10 | 1000 | 1 | 800 | 0.0125 | 0.6 | 0.625 |
| 11 | 1100 | 1 | 800 | 0.0125 | 0.6 | 0.6375 |
| 12 | 1200 | 1 | 800 | 0.0125 | 0.6 | 0.65 |
| 13 | 1300 | 1 | 800 | 0.0125 | 0.6 | 0.6625 |
| 14 | 1400 | 1 | 800 | 0.0125 | 0.6 | 0.675 |
| 15 | 1500 | 1 | 800 | 0.0125 | 0.6 | 0.6875 |
| 16 | 1600 | 2 | 1600 | 0.015625 | 0.7 | 0.7 |
| 17 | 1700 | 2 | 1600 | 0.015625 | 0.7 | 0.715625 |
| 18 | 1800 | 2 | 1600 | 0.015625 | 0.7 | 0.73125 |
| 19 | 1900 | 2 | 1600 | 0.015625 | 0.7 | 0.746875 |
| 20 | 2000 | 2 | 1600 | 0.015625 | 0.7 | 0.7625 |
| 21 | 2100 | 2 | 1600 | 0.015625 | 0.7 | 0.778125 |
| 22 | 2200 | 2 | 1600 | 0.015625 | 0.7 | 0.79375 |
| 23 | 2300 | 2 | 1600 | 0.015625 | 0.7 | 0.809375 |
| 24 | 2400 | 2 | 1600 | 0.015625 | 0.7 | 0.825 |
| 25 | 2500 | 2 | 1600 | 0.015625 | 0.7 | 0.840625 |
| 26 | 2600 | 2 | 1600 | 0.015625 | 0.7 | 0.85625 |
| 27 | 2700 | 2 | 1600 | 0.015625 | 0.7 | 0.871875 |
| 28 | 2800 | 2 | 1600 | 0.015625 | 0.7 | 0.8875 |
| 29 | 2900 | 2 | 1600 | 0.015625 | 0.7 | 0.903125 |
| 30 | 3000 | 2 | 1600 | 0.015625 | 0.7 | 0.91875 |
| 31 | 3100 | 2 | 1600 | 0.015625 | 0.7 | 0.934375 |
| 32 | 3200 | 3 | 3200 | 0.03125 | 0.95 | 0.95 |
| 33 | 3300 | 3 | 3200 | 0.03125 | 0.95 | 0.98125 |
| 34 | 3400 | 3 | 3200 | 0.03125 | 0.95 | 1.0125 |
| 35 | 3500 | 3 | 3200 | 0.03125 | 0.95 | 1.04375 |
| 36 | 3600 | 3 | 3200 | 0.03125 | 0.95 | 1.075 |
| 37 | 3700 | 3 | 3200 | 0.03125 | 0.95 | 1.10625 |
| 38 | 3800 | 3 | 3200 | 0.03125 | 0.95 | 1.1375 |
| 39 | 3900 | 3 | 3200 | 0.03125 | 0.95 | 1.16875 |
| 40 | 4000 | 4 | 4000 | 0 | 1.2 | 1.2 |

Table 2 presented above illustrates another example of a reference V/F curve for different BCLK frequency values using a BCLK rate of 100 MHz. As shown, in Table 2 above, input PLL ratio includes values from 8 to 40, corresponding input BCLK frequencies include values from 800 MHz, to 4000 MHz, and corresponding voltage values from 0.6V to 1.2V. Some example of the voltages calculated for different BCLK frequencies are 0.65V for 1200 MHz, 0.7625V for 2000 MHz, and 1.075V for 3600 MHz.

Figure 2A:
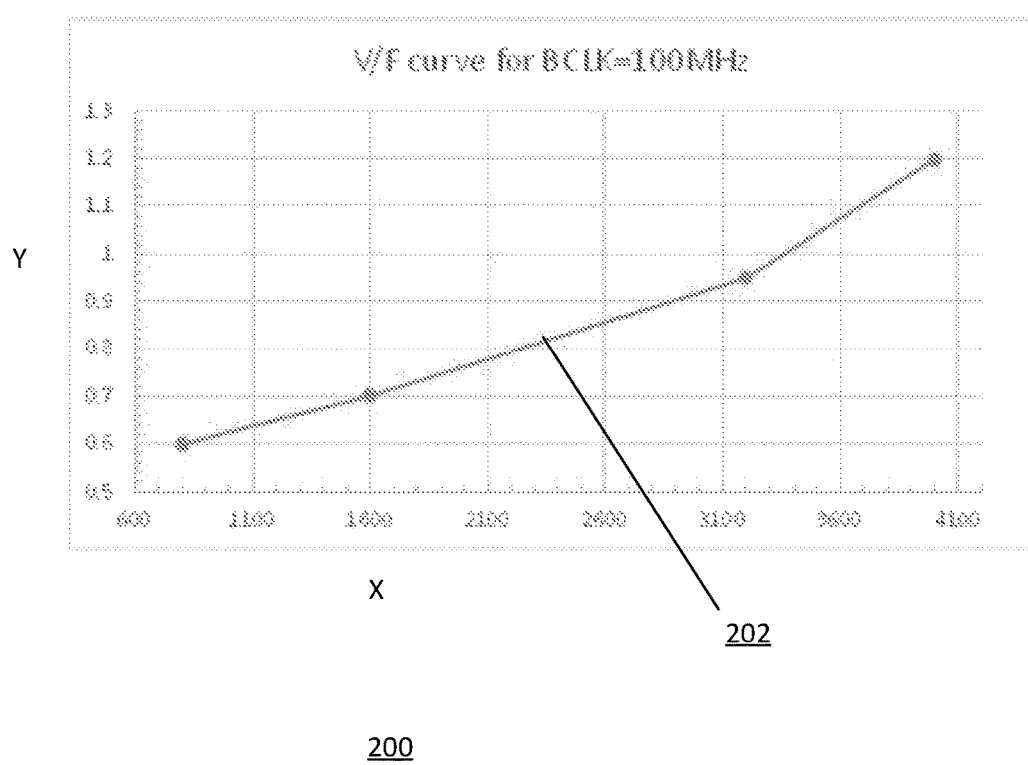
FIG. 2A is an example of a graph illustrating one implementation of implementing a power management unit according to an implementation of the disclosure.

FIG. 2A illustrates an example of a graph 200 of a reference V/F curve 202 as computed in Table 1 according to an implementation of the disclosure. An example of the reference BCLK rate of the reference V/F cure 202 is 100 MHz. As illustrated in the graph 200 in FIG. 2A, the reference V/F curve 202 is calculated using four different BCLK frequency (measured in MHz)/voltage (measured in Volts) pairs, which were previously-selected and defined as reference values to the reference V/F curve 202. As shown, the BCLK frequencies are selected from the range of 800 MHz to 4,000 MHz and voltages are selected from the range of 0.6V to 1.2V. In addition, as shown, in the graph 200, the four different pairs of previously-selected reference BCLK frequency/reference voltage pairs are (800 MHz, 0.6V), (1600 MHz, 0.7V), (3200 MHz, 0.95V), and (4000 MHz, 1.2V). In one implementation, data is interpolated for the remaining BCLK frequencies that were not reference BCLK frequencies in the 800 MHz to 4,000 MHz range in order to compute another reference V/F curve, as is described in further detail below with respect to FIG. 2B.

Figure 2B:
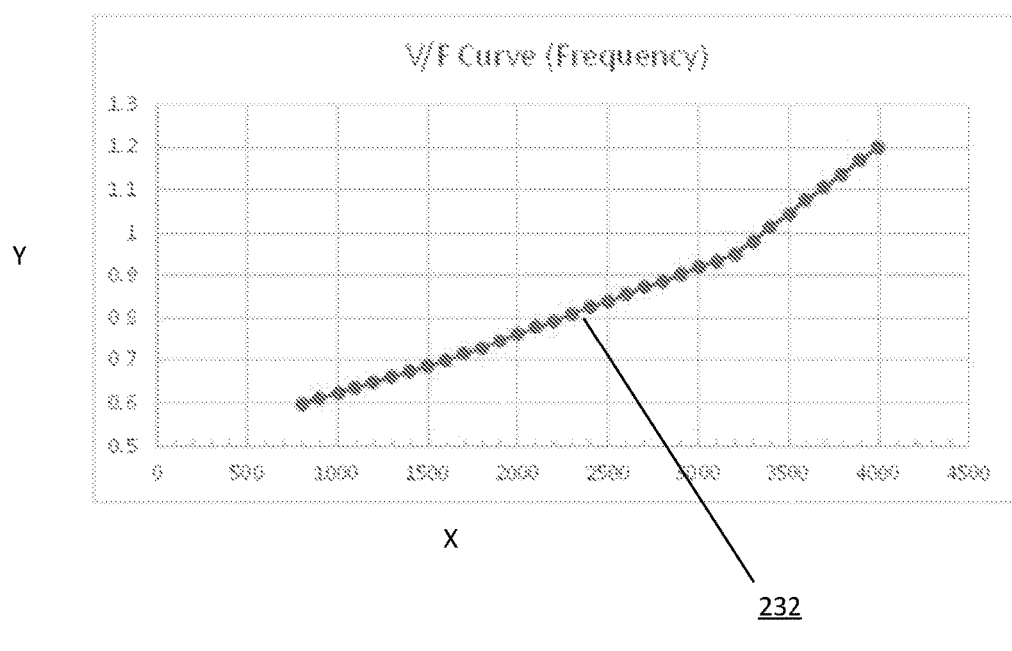
FIG. 2B is an example of a graph illustrating another implementation of implementing a power management unit according to an implementation of the disclosure.

FIG. 2B is an example of a graph 230 illustrating the reference V/F curve 232 using the BCLK frequency and Voltage values illustrated in the Table 2 according to an implementation of the disclosure. As illustrated in the graph 230 in FIG. 2B, the reference V/F curve is generated for the BCLK frequencies ranging from 800 MHz to 4,000 MHz with approximately thirty-three different pairs of BCLK frequencies (measured in MHz) and voltages (measured in Volts), including the four previously-selected and defined as reference values to the reference V/F curve 202 of FIG. 2A. As shown, the BCLK frequencies are selected based on the BCLK rate of 100 MHz.

In one implementation, power management unit 110 determines that the BCLK rate in the received BCLK frequency signal 152 is higher than the default BCLK rate. As discussed above, overclocking occurs when the clock frequency is increased above a default clock rate of the clock in order to run the processor at a higher speed. In one implementation, the power management unit 110 determines a difference between the value of the BCLK rate in the received BCLK frequency signal 152 and a default BCLK rate. In one implementation, the difference between the value of the BCLK rate in the BCLK frequency signal 152 and the default BCLK rate exceeds a threshold. Such threshold may be in the range of 0.1% to 1%. In one implementation, when it is determined that the difference between the received BCLK rate and the reference BCLK rate exceeds the threshold, the power management unit computes a new V/F curve. In one implementation, the power management unit 110 determines a voltage value for different BCLK frequency values. The power management unit 110 determines a voltage value for all the different BCLK frequency values where a difference between the received BCLK rate and the reference BCLK frequency rate is greater than a threshold (e.g., threshold number or threshold percentage). In one implementation, the power management unit 110 resamples the V/F values from the reference V/F curve in FIG. 2B to compute a new V/F curve for each of the BCLK frequencies from the reference V/F curve and further conducts data interpolation for remaining BCLK frequencies that were not in the reference BCLK frequencies range in the reference V/F curve as described in detail with respect to Table 3 and FIG. 2C below.

In one implementation, the power management unit 110 sends a voltage request signal 158 to a voltage regulator 110. The voltage request signal 158 includes an instruction to the voltage regulator 110 to regulate the voltage of the processor 102 at a specific value for the default BCLK reference rate. The voltage regulator 110 generates a voltage regulate signal 160 to maintain the voltage of the processor 102 at this specific value regardless of the increase in the BCLK frequency of the processor 102. For example, referring back to Table 2 and FIG. 2B, the specific value to regulate the voltage is 1.2V at a BCLK frequency of 4,000 MHz. As such, regardless of increase in the BCLK frequency above the 4,000 MHz, the voltage of the processor will be remaining at 1.2V.

Table 3 presented below illustrates an example of a new V/F curve for different BCLK frequency values using a BCLK rate of 150 MHz. The BCLK rate of 150 MHz is higher than the default BCLK rate of 100 MHz of the processor as illustrated in Table 2. As discussed above, the power management unit 110 determines a voltage value for all the different BCLK frequency values where a difference between the received BCLK rate and the default BCLK frequency rate is greater than a threshold (e.g., threshold number or threshold percentage). In the example of Table 3, the difference between the 150 MHz in BCLK rate and the default BCLK rate is 50 MHz, which is determined to be greater than the threshold As such, a new V/F curve is determined for the received BCLK rate of 150 MHz. As shown, in Table 3 below, input PLL ratio includes values ranging from and including 8 to 40 and corresponding input BCLK frequencies ranging from and including 1200 MHz to 6,000 MHz, and corresponding voltage values ranging from and including 0.65 to 1.2V. Some example of the voltages calculated for different BCLK frequencies are 0.65V for 1200 MHz, 0.825V for 2400 MHz, and 1.075V for 3600 MHz. In addition, as shown in Table 3 below, the value of the voltage remains at a constant value of 1.2V for the BCLK frequencies above 4,000 MHz. As such, the voltage regulator 110 maintains the voltage of the processor 102 at 1.2 V even when the BCLK frequency is above 4,000 MHz.

TABLE 3

New V/F curve calculation

| Ratio | Freq | index in ratio | base F | V step | Base V | Voltage |
|---|---|---|---|---|---|---|
| 8 | 1200 | 1 | 800 | 0.0125 | 0.6 | 0.65 |
| 9 | 1350 | 1 | 800 | 0.0125 | 0.6 | 0.66875 |
| 10 | 1500 | 1 | 800 | 0.0125 | 0.6 | 0.6875 |
| 11 | 1650 | 2 | 1600 | 0.015625 | 0.7 | 0.707813 |
| 12 | 1800 | 2 | 1600 | 0.015625 | 0.7 | 0.73125 |
| 13 | 1950 | 2 | 1600 | 0.015625 | 0.7 | 0.754688 |
| 14 | 2100 | 2 | 1600 | 0.015625 | 0.7 | 0.778125 |
| 15 | 2250 | 2 | 1600 | 0.015625 | 0.7 | 0.801563 |
| 16 | 2400 | 2 | 1600 | 0.015625 | 0.7 | 0.825 |
| 17 | 2550 | 2 | 1600 | 0.015625 | 0.7 | 0.848438 |
| 18 | 2700 | 2 | 1600 | 0.015625 | 0.7 | 0.871875 |
| 19 | 2850 | 2 | 1600 | 0.015625 | 0.7 | 0.895313 |
| 20 | 3000 | 2 | 1600 | 0.015625 | 0.7 | 0.91875 |
| 21 | 3150 | 2 | 1600 | 0.015625 | 0.7 | 0.942188 |
| 22 | 3300 | 3 | 3200 | 0.03125 | 0.95 | 0.98125 |
| 23 | 3450 | 3 | 3200 | 0.03125 | 0.95 | 1.028125 |
| 24 | 3600 | 3 | 3200 | 0.03125 | 0.95 | 1.075 |
| 25 | 3750 | 3 | 3200 | 0.03125 | 0.95 | 1.121875 |
| 26 | 3900 | 3 | 3200 | 0.03125 | 0.95 | 1.16875 |
| 27 | 4050 | 4 | 4000 | 0 | 1.2 | 1.2 |
| 28 | 4200 | 4 | 4000 | 0 | 1.2 | 1.2 |
| 29 | 4350 | 4 | 4000 | 0 | 1.2 | 1.2 |
| 30 | 4500 | 4 | 4000 | 0 | 1.2 | 1.2 |
| 31 | 4650 | 4 | 4000 | 0 | 1.2 | 1.2 |
| 32 | 4800 | 4 | 4000 | 0 | 1.2 | 1.2 |
| 33 | 4950 | 4 | 4000 | 0 | 1.2 | 1.2 |
| 34 | 5100 | 4 | 4000 | 0 | 1.2 | 1.2 |
| 35 | 5250 | 4 | 4000 | 0 | 1.2 | 1.2 |
| 36 | 5400 | 4 | 4000 | 0 | 1.2 | 1.2 |

TABLE 3-continued

New V/F curve calculation

| Ratio | Freq | index in ratio | base F | V step | Base V | Voltage |
|---|---|---|---|---|---|---|
| 37 | 5550 | 4 | 4000 | 0 | 1.2 | 1.2 |
| 38 | 5700 | 4 | 4000 | 0 | 1.2 | 1.2 |
| 39 | 5850 | 4 | 4000 | 0 | 1.2 | 1.2 |
| 40 | 6000 | 4 | 4000 | 0 | 1.2 | 1.2 |

Figure 2C:
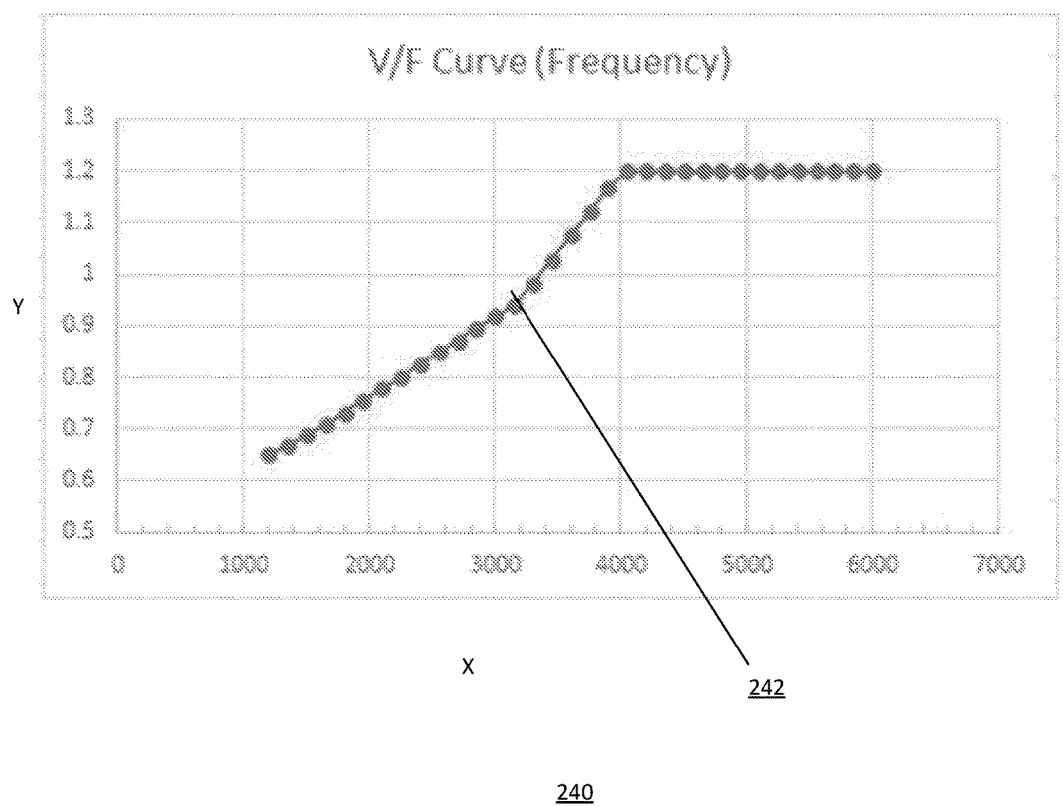
FIG. 2C is an example of a graph illustrating a further implementation of implementing a power management unit according to an implementation of the disclosure

FIG. 2C is an example of a graph 240 illustrating a new V/F curve 242 using the BCLK frequency and Voltage values illustrated in Table 3 above according to an implementation of the disclosure. As illustrated in the graph 240 in FIG. 2C, the new V/F curve 242 is generated for the BCLK rate of 150 MHz. As shown, the new V/F curve 242 follows very similar to the reference V/F curve 232 until the voltage reaches at 1.2V at a BCLK frequency of approximate 4,000 MHz, where the voltage remains at the 1.2V even when the BCLK frequency continues to increase above 4,000 MHz. As discussed above, data is interpolated for the remaining BCLK frequencies that are not in the BCLK frequency range of the reference V/F curve in FIG. 2B. Accordingly, in the example of the new V/F curve as shown in FIG. 2C, data such as Voltage is interpolated for the remaining BCLK frequencies such as values above 4,000 MHz that were not in the reference BCLK frequencies in the 800 MHz to 4,000 MHz range. Such data interpolation includes keeping the voltage same at 1.2V for the BCLK frequency values above the 4,000 MHz as shown in FIG. 2C. In one implementation, other types of data interpolation may be computed to generate a new V/F curve.

Figure 3:
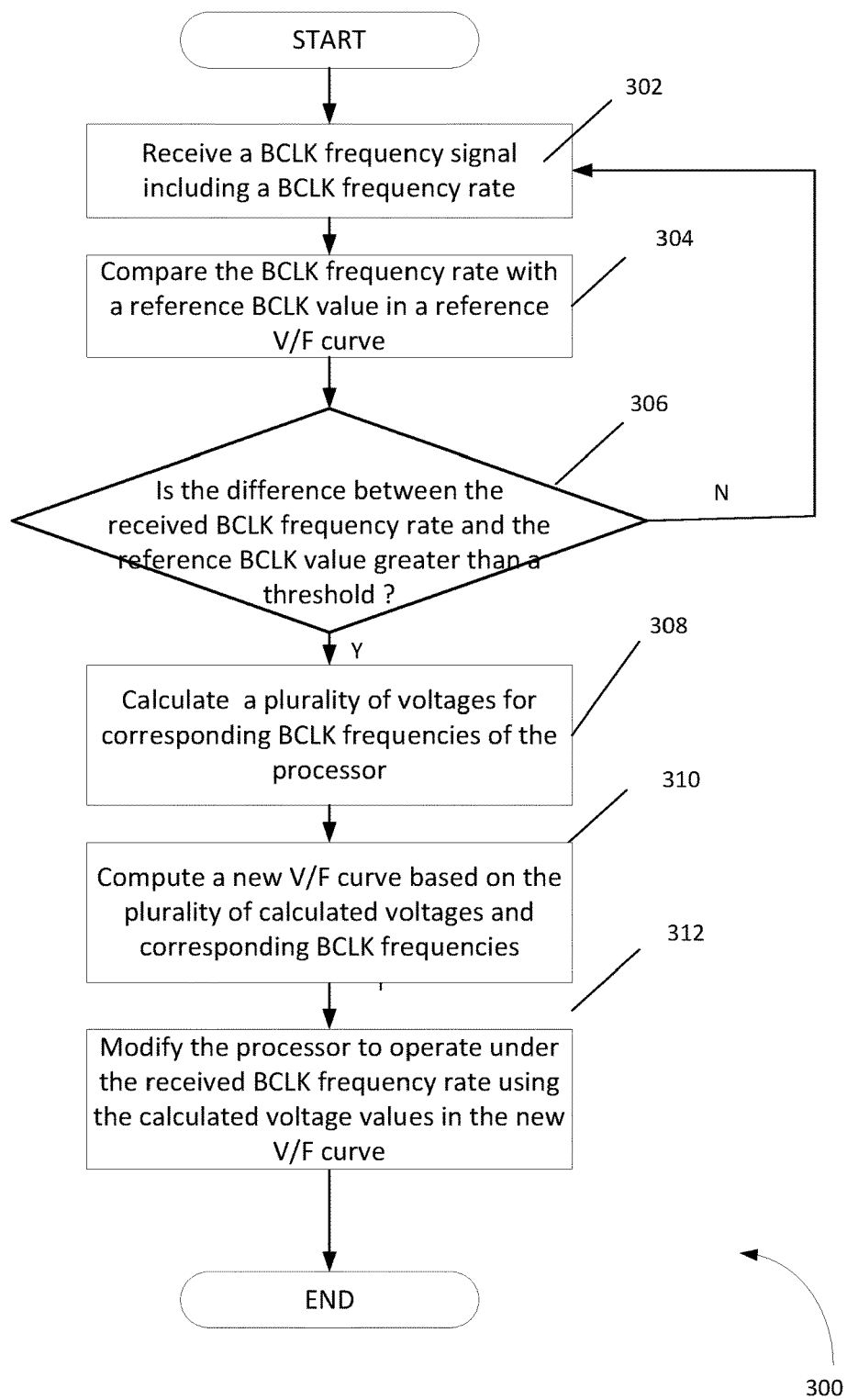
FIG. 3 is a flow diagram illustrating a method for operations of a power management unit according to an implementation of the disclosure.

FIG. 3 is a flow diagram of a method of providing a BCLK aware adaptive voltage for overclocking in a computer system for a processing device, according to an implementation of the disclosure. Method 300 may be performed by processing logic that may include hardware (e.g., circuitry, dedicated logic, programmable logic, microcode, etc.), software (such as instructions run on a processing system, a general purpose computer system, or a dedicated machine), firmware, or a combination thereof. In one implementation, method 300 may be performed, in part, by the power management unit 110 described with respect to FIG. 1.

For simplicity of explanation, the method 300 is depicted and described as a series of acts. However, acts in accordance with this disclosure can occur in various orders and/or concurrently and with other acts not presented and described herein. Furthermore, not all illustrated acts may be performed to implement the method 300 in accordance with the disclosed subject matter. In addition, those skilled in the art will understand and appreciate that the method 300 could alternatively be represented as a series of interrelated states via a state diagram or events.

Referring to FIG. 3, at block 302, a BCLK frequency signal including a BCLK frequency rate is received. At block 304, the received BCLK frequency rate is compared with a reference (default) BCLK frequency rate in a reference V/F curve. As discussed above, the reference BCLK frequency rate may be a user-specified value. As discussed above, the reference BCLK frequency value is determined from a V/F curve. The reference V/F curve may be calculated using several different pairs of reference BCLK frequencies (measured in MHz) and reference voltages (measured in Volts), where the pairs are defined as reference values to the reference V/F curve.

Subsequently, at block 306, it is determined whether a difference in the received BCLK frequency rate and the reference BCLK frequency rate is greater than a threshold. In one example, the threshold is a threshold number. In another example, the threshold is a threshold percentage. When, at block 306, it is determined that the difference in received BCLK frequency rate and the reference BCLK frequency rate is not above the threshold, then method 300 returns to block 302 to receive a next BCLK frequency signal. In one implementation, the threshold may be in the range of 0.1% to 1%. In one implementation, the BCLK frequency rate is determined to be higher than the reference BCLK frequency rate, for example, due to overclocking. As discussed above, overclocking occurs when the clock frequency is increased above a default clock rate of the clock in order to execute the processor at a higher speed. When, at block 306, is determined that the difference between the received BCLK frequency rate and the reference BCLK frequency rate is greater than threshold, then method 300 proceeds to block 308. At block 308, a plurality of voltages are calculated for corresponding plurality of BCLK frequencies of the processor. In one implementation, the voltage values are calculated using the process as described above. At block 310, a new V/F curve is computed based on the plurality of the calculated voltages and the corresponding BCLK frequencies. As discussed above, in one implementation, the voltage values of the new V/F curve are interpolated for BCLK frequencies falling outside the range of the BCLK frequencies in the reference V/F curve. At block 312, the processor is modified to operate under the received BCLK frequency rate using the calculated voltage values in the new V/F curve. As such, the new V/F curve may then be utilized by the processor to operate using the voltage for the received BCLK frequency rate.

Figure 4A:
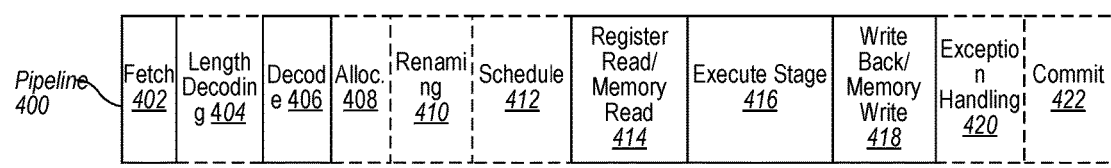
FIG. 4A is a block diagram illustrating a micro-architecture for a processor in which one implementation of the disclosure may be used.

FIG. 4A is a block diagram illustrating an in-order pipeline and a register renaming stage, out-of-order issue/execution pipeline implemented by processing device 400 according to some implementations of the disclosure. The solid lined boxes in FIG. 4A illustrate an in-order pipeline, while the dashed lined boxes illustrates a register renaming, out-of-order issue/execution pipeline. In FIG. 4A, a processor pipeline 400 includes a fetch stage 402, a length decode stage 404, a decode stage 406, an allocation stage 408, a renaming stage 410, a scheduling (also known as a dispatch or issue) stage 412, a register read/memory read stage 414, an execute stage 416, a write back/memory write stage 418, an exception handling stage 422, and a commit stage 424. In some implementations, the ordering of stages 402-424 may be different than illustrated and are not limited to the specific ordering shown in FIG. 4A.

Figure 4B:
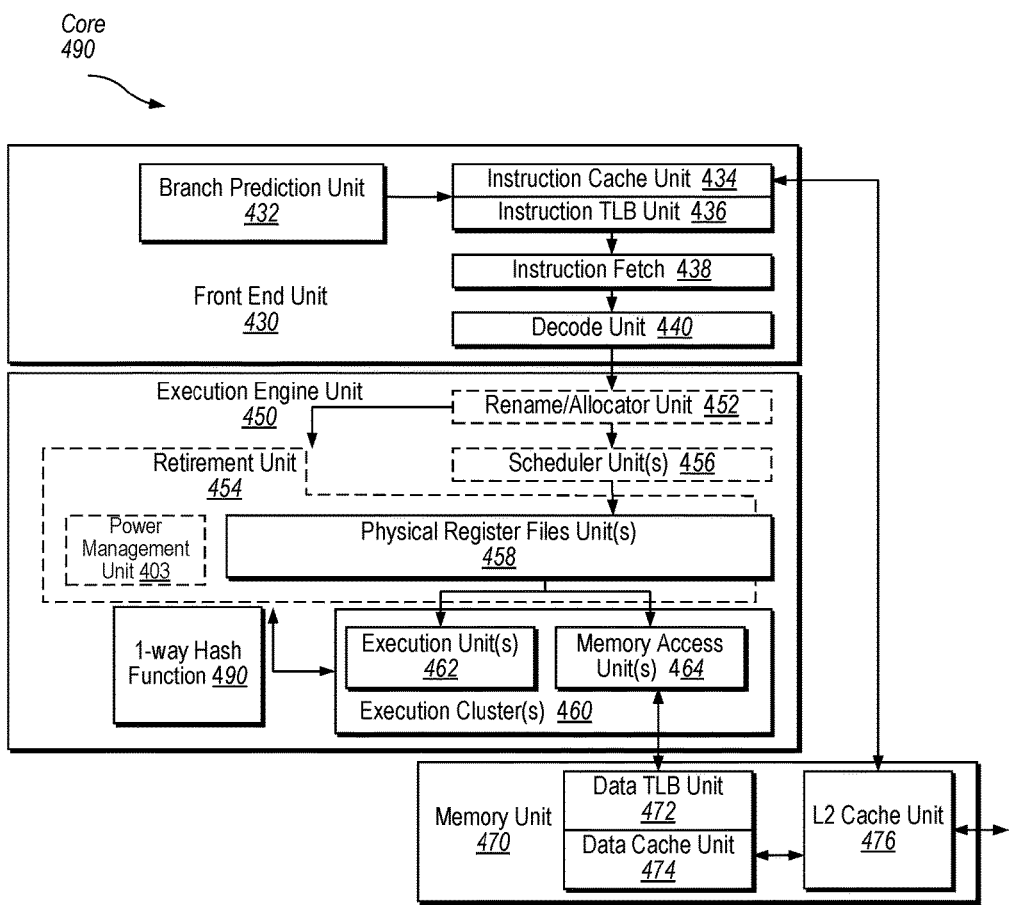
FIG. 4B is a block diagram illustrating an in-order pipeline and a register renaming stage, out-of-order issue/execution pipeline implemented according to at least one implementation of the disclosure.

FIG. 4B is a block diagram illustrating a micro-architecture for a processor 400 that implements the processing device including heterogeneous cores in accordance with one implementation of the disclosure. Specifically, processor 400 depicts an in-order architecture core and a register renaming logic, out-of-order issue/execution logic to be included in a processor according to at least one implementation of the disclosure.

Processor 400 includes a front end unit 430 coupled to an execution engine unit 450, and both are coupled to a memory unit 470. The processor 400 may include a reduced instruction set computing (RISC) core, a complex instruction set computing (CISC) core, a very long instruction word (VLIW) core, or a hybrid or alternative core type. As yet another option, processor 400 may include a special-purpose core, such as, for example, a network or communication core, compression engine, graphics core, or the like. In one implementation, processor 400 may be a multi-core processor or may part of a multi-processor system.

The front end unit 430 includes a branch prediction unit 432 coupled to an instruction cache unit 434, which is coupled to an instruction translation lookaside buffer (TLB) 436, which is coupled to an instruction fetch unit 438, which is coupled to a decode unit 440. The decode unit 440 (also known as a decoder) may decode instructions, and generate as an output one or more micro-operations, micro-code entry points, microinstructions, other instructions, or other control signals, which are decoded from, or which otherwise reflect, or are derived from, the original instructions. The decoder 440 may be implemented using various different mechanisms. Examples of suitable mechanisms include, but are not limited to, look-up tables, hardware implementations, programmable logic arrays (PLAs), microcode read only memories (ROMs), etc. The instruction cache unit 434 is further coupled to the memory unit 470. The decode unit 440 is coupled to a rename/allocator unit 452 in the execution engine unit 450.

The execution engine unit 450 includes the rename/allocator unit 452 coupled to a retirement unit 454 and a set of one or more scheduler unit(s) 456. The retirement unit 454 may include a power management unit 403 for processing devices according to implementations of the invention. The scheduler unit(s) 456 represents any number of different schedulers, including reservations stations (RS), central instruction window, etc. The scheduler unit(s) 456 is coupled to the physical register file(s) unit(s) 458. Each of the physical register file(s) units 458 represents one or more physical register files, different ones of which store one or more different data types, such as scalar integer, scalar floating point, packed integer, packed floating point, vector integer, vector floating point, etc., status (e.g., an instruction pointer that is the address of the next instruction to be executed), etc. The physical register file(s) unit(s) 458 is overlapped by the retirement unit 454 to illustrate various ways in which register renaming and out-of-order execution may be implemented (e.g., using a reorder buffer(s) and a retirement register file(s), using a future file(s), a history buffer(s), and a retirement register file(s); using a register maps and a pool of registers; etc.).

In one implementation, processor 400 may be the same as a processor 102 described with respect to FIG. 1.

Generally, the architectural registers are visible from the outside of the processor or from a programmer's perspective. The registers are not limited to any known particular type of circuit. Various different types of registers are suitable as long as they are capable of storing and providing data as described herein. Examples of suitable registers include, but are not limited to, dedicated physical registers, dynamically allocated physical registers using register renaming, combinations of dedicated and dynamically allocated physical registers, etc. The retirement unit 454 and the physical register file(s) unit(s) 458 are coupled to the execution cluster(s) 460. The execution cluster(s) 560 includes a set of one or more execution units 462 and a set of one or more memory access units 464. The execution units 462 may perform various operations (e.g., shifts, addition, subtraction, multiplication) and operate on various types of data (e.g., scalar floating point, packed integer, packed floating point, vector integer, vector floating point).

While some implementations may include a number of execution units dedicated to specific functions or sets of functions, other implementations may include only one execution unit or multiple execution units that all perform all functions. The scheduler unit(s) 456, physical register file(s) unit(s) 458, and execution cluster(s) 460 are shown as being possibly plural because certain implementations create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain implementations are implemented in which only the execution cluster of this pipeline has the memory access unit(s) 464). It should also be understood that where separate pipelines are used, one or more of these pipelines may be out-of-order issue/execution and the rest in-order.

The set of memory access units 464 is coupled to the memory unit 470, which may include a data prefetcher 480, a data TLB unit 472, a data cache unit (DCU) 474, and a level 2 (L2) cache unit 476, to name a few examples. In some implementations DCU 474 is also known as a first level data cache (L1 cache). The DCU 474 may handle multiple outstanding cache misses and continue to service incoming stores and loads. It also supports maintaining cache coherency. The data TLB unit 472 is a cache used to improve virtual address translation speed by mapping virtual and physical address spaces. In one exemplary implementation, the memory access units 464 may include a load unit, a store address unit, and a store data unit, each of which is coupled to the data TLB unit 472 in the memory unit 470. The L2 cache unit 476 may be coupled to one or more other levels of cache and eventually to a main memory.

In one implementation, the data prefetcher 480 speculatively loads/prefetches data to the DCU 474 by automatically predicting which data a program is about to consume. Prefeteching may refer to transferring data stored in one memory location of a memory hierarchy (e.g., lower level caches or memory) to a higher-level memory location that is closer (e.g., yields lower access latency) to the processor before the data is actually demanded by the processor. More specifically, prefetching may refer to the early retrieval of data from one of the lower level caches/memory to a data cache and/or prefetch buffer before the processor issues a demand for the specific data being returned.

The processor 400 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.).

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated implementation of the processor also includes a separate instruction and data cache units and a shared L2 cache unit, alternative implementations may have a single internal cache for both instructions and data, such as, for example, a Level 1 (L1) internal cache, or multiple levels of internal cache. In some implementations, the system may include a combination of an internal cache and an external cache that is external to the core and/or the processor. Alternatively, all of the cache may be external to the core and/or the processor.

Figure 5:
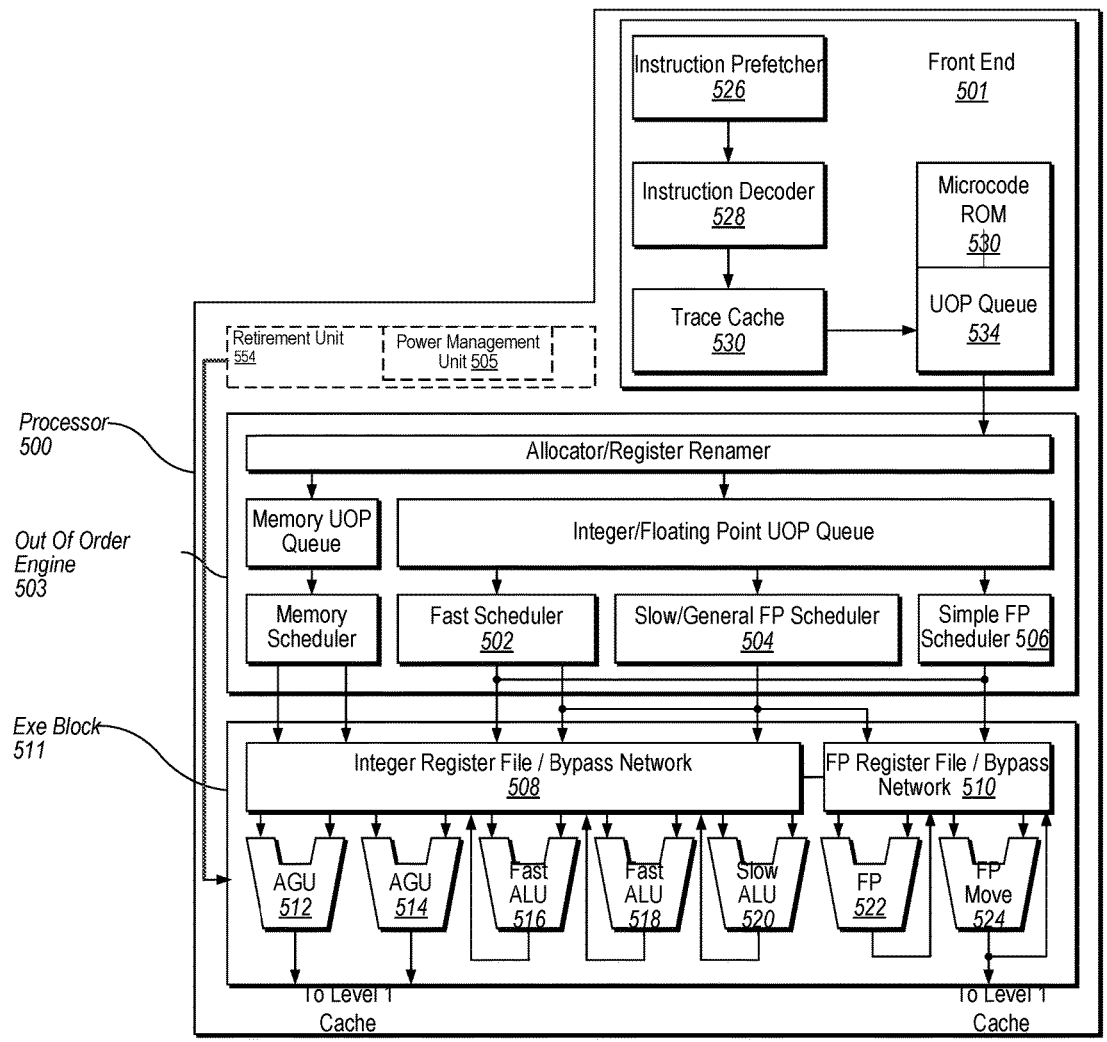
FIG. 5 illustrates a block diagram of the micro-architecture for a processor in accordance with one implementation of the disclosure.

FIG. 5 illustrates a block diagram of the micro-architecture for a processor 500 that includes hybrid cores in accordance with one implementation of the disclosure. In some implementations, an instruction in accordance with one implementation can be implemented to operate on data elements having sizes of byte, word, doubleword, quadword, etc., as well as datatypes, such as single and double precision integer and floating point datatypes. In one implementation the in-order front end 501 is the part of the processor 500 that fetches instructions to be executed and prepares them to be used later in the processor pipeline.

The front end 501 may include several units. In one implementation, the instruction prefetcher 526 fetches instructions from memory and feeds them to an instruction decoder 528 which in turn decodes or interprets them. For example, in one implementation, the decoder decodes a received instruction into one or more operations called "micro-instructions" or "micro-operations" (also called micro op or uops) that the machine can execute. In other implementations, the decoder parses the instruction into an opcode and corresponding data and control fields that are used by the micro-architecture to perform operations in accordance with one implementation. In one implementation, the trace cache 530 takes decoded uops and assembles them into program ordered sequences or traces in the uop queue 534 for execution. When the trace cache 530 encounters a complex instruction, the microcode ROM 532 provides the uops needed to complete the operation.

Some instructions are converted into a single micro-op, whereas others need several micro-ops to complete the full operation. In one implementation, if more than four micro-ops are needed to complete an instruction, the decoder 528 accesses the microcode ROM 532 to do the instruction. For one implementation, an instruction can be decoded into a small number of micro ops for processing at the instruction decoder 528. In another implementation, an instruction can be stored within the microcode ROM 532 should a number of micro-ops be needed to accomplish the operation. The trace cache 530 refers to an entry point programmable logic array (PLA) to determine a correct micro-instruction pointer for reading the micro-code sequences to complete one or more instructions in accordance with one implementation from the micro-code ROM 532. After the microcode ROM 532 finishes sequencing micro-ops for an instruction, the front end 501 of the machine resumes fetching micro-ops from the trace cache 530.

The out-of-order execution engine 503 is where the instructions are prepared for execution. The out-of-order execution logic has a number of buffers to smooth out and re-order the flow of instructions to optimize performance as they go down the pipeline and get scheduled for execution. The allocator logic allocates the machine buffers and resources that each uop needs in order to execute. The register renaming logic renames logic registers onto entries in a register file. The allocator also allocates an entry for each uop in one of the two uop queues, one for memory operations and one for non-memory operations, in front of the instruction schedulers: memory scheduler, fast scheduler 502, slow/general floating point scheduler 504, and simple floating point scheduler 506. The uop schedulers 502, 504, 506, determine when a uop is ready to execute based on the readiness of their dependent input register operand sources and the availability of the execution resources the uops need to complete their operation. The fast scheduler 502 of one implementation can schedule on each half of the main clock cycle while the other schedulers can only schedule once per main processor clock cycle. The schedulers arbitrate for the dispatch ports to schedule uops for execution.

Register files 508, 510, sit between the schedulers 502, 504, 506, and the execution units 512, 514, 516, 518, 520, 522, 524 in the execution block 511. There is a separate register file 508, 510, for integer and floating point operations, respectively. Each register file 508, 510, of one implementation also includes a bypass network that can bypass or forward just completed results that have not yet been written into the register file to new dependent uops. The integer register file 508 and the floating point register file 510 are also capable of communicating data with the other. For one implementation, the integer register file 508 is split into two separate register files, one register file for the low order 32 bits of data and a second register file for the high order 32 bits of data. The floating point register file 510 of one implementation has 128 bit wide entries because floating point instructions typically have operands from 54 to 128 bits in width.

The execution block 511 contains the execution units 512, 514, 516, 518, 520, 522, 524, where the instructions are actually executed. This section includes the register files 508, 510, that store the integer and floating point data operand values that the micro-instructions need to execute. The processor 500 of one implementation is comprised of a number of execution units: address generation unit (AGU) 512, AGU 514, fast ALU 516, fast ALU 518, slow ALU 520, floating point ALU 522, floating point move unit 524.

For one implementation, the floating point execution blocks 522, 524, execute floating point, MMX, SIMD, and SSE, or other operations. The floating point ALU 522 of one implementation includes a 64 bit by 64 bit floating point divider to execute divide, square root, and remainder micro-ops. For implementations of the disclosure, instructions involving a floating point value may be handled with the floating point hardware.

In one implementation, the ALU operations go to the high-speed ALU execution units 516, 518. The fast ALUs 516, 518, of one implementation can execute fast operations with an effective latency of half a clock cycle. For one implementation, most complex integer operations go to the slow ALU 520 as the slow ALU 520 includes integer execution hardware for long latency type of operations, such as a multiplier, shifts, flag logic, and branch processing. Memory load/store operations are executed by the AGUs 512, 514. For one implementation, the integer ALUs 516, 518, 520, are described in the context of performing integer operations on 64 bit data operands. In alternative implementations, the ALUs 516, 518, 520, can be implemented to support a variety of data bits including 16, 32, 128, 256, etc. Similarly, the floating point units 522, 524, can be implemented to support a range of operands having bits of various widths. For one implementation, the floating point units 522, 524, can operate on 128 bits wide packed data operands in conjunction with SIMD and multimedia instructions.

In one implementation, the uops schedulers 502, 504, 506, dispatch dependent operations before the parent load has finished executing. As uops are speculatively scheduled and executed in processor 500, the processor 500 also includes logic to handle memory misses. If a data load misses in the data cache, there can be dependent operations in flight in the pipeline that have left the scheduler with temporarily incorrect data. A replay mechanism tracks and re-executes instructions that use incorrect data. Only the dependent operations need to be replayed and the independent ones are allowed to complete. The schedulers and replay mechanism of one implementation of a processor are also designed to catch instruction sequences for text string comparison operations.

The processor 500 also includes logic to implement store address prediction for memory disambiguation according to implementations of the disclosure. In one implementation, the execution block 511 of processor 500 may include a store address predictor (not shown) for implementing store address prediction for memory disambiguation.

The processor 500 may include a retirement unit 554 coupled to the execution block 511. The retirement unit 554 may include may include a power management unit 505 for processing devices according to implementations of the disclosure.

The term "registers" may refer to the on-board processor storage locations that are used as part of instructions to identify operands. In other words, registers may be those that are usable from the outside of the processor (from a programmer's perspective). However, the registers of an implementation should not be limited in meaning to a particular type of circuit. Rather, a register of an implementation is capable of storing and providing data, and performing the functions described herein. The registers described herein can be implemented by circuitry within a processor using any number of different techniques, such as dedicated physical registers, dynamically allocated physical registers using register renaming, combinations of dedicated and dynamically allocated physical registers, etc. In one implementation, integer registers store thirty-two bit integer data. A register file of one implementation also contains eight multimedia SIMD registers for packed data.

For the discussions below, the registers are understood to be data registers designed to hold packed data, such as 64 bits wide MMXTM registers (also referred to as 'mm' registers in some instances) in microprocessors enabled with MMX technology from Intel Corporation of Santa Clara, Calif. These MMX registers, available in both integer and floating point forms, can operate with packed data elements that accompany SIMD and SSE instructions. Similarly, 128 bits wide XMM registers relating to SSE2, SSE3, SSE4, or beyond (referred to generically as "SSEx") technology can also be used to hold such packed data operands. In one implementation, in storing packed data and integer data, the registers do not need to differentiate between the two data types. In one implementation, integer and floating point are either contained in the same register file or different register files. Furthermore, in one implementation, floating point and integer data may be stored in different registers or the same registers.

Figure 6:
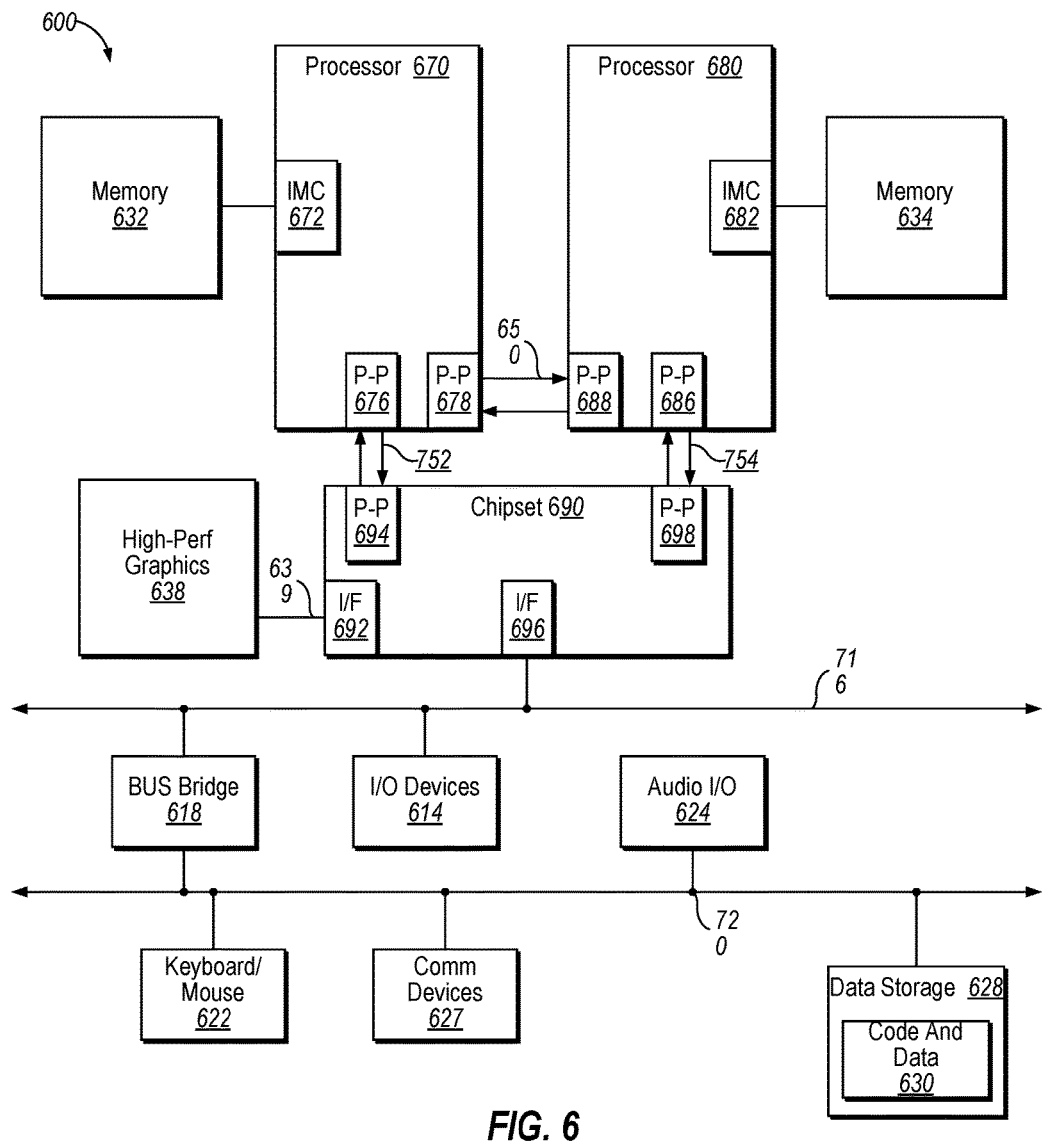
FIG. 6 is a block diagram illustrating a system in which an implementation of the disclosure may be used.

Referring now to FIG. 6, shown is a block diagram illustrating a system 600 in which an implementation of the disclosure may be used. As shown in FIG. 6, multiprocessor system 600 is a point-to-point interconnect system, and includes a first processor 670 and a second processor 680 coupled via a point-to-point interconnect 650. While shown with only two processors 670, 680, it is to be understood that the scope of implementations of the disclosure is not so limited. In other implementations, one or more additional processors may be present in a given processor. In one implementation, the multiprocessor system 600 may implement hybrid cores as described herein.

Processors 670 and 680 are shown including integrated memory controller units 672 and 682, respectively. Processor 670 also includes as part of its bus controller units point-to-point (P-P) interfaces 676 and 678; similarly, second processor 680 includes P-P interfaces 686 and 688. Processors 670, 680 may exchange information via a point-to-point (P-P) interface 650 using P-P interface circuits 678, 688. As shown in FIG. 6, IMCs 672 and 682 couple the processors to respective memories, namely a memory 632 and a memory 634, which may be portions of main memory locally attached to the respective processors.

Processors 670, 680 may each exchange information with a chipset 790 via individual P-P interfaces 652, 654 using point to point interface circuits 676, 694, 686, 698. Chipset 690 may also exchange information with a high-performance graphics circuit 638 via a high-performance graphics interface 639.

A shared cache (not shown) may be included in either processor or outside of both processors, yet connected with the processors via P-P interconnect, such that either or both processors' local cache information may be stored in the shared cache if a processor is placed into a low power mode.

Chipset 690 may be coupled to a first bus 616 via an interface 696. In one implementation, first bus 616 may be a Peripheral Component Interconnect (PCI) bus, or a bus such as a PCI Express bus or another third generation I/O interconnect bus, although the scope of the disclosure is not so limited.

As shown in FIG. 6, various I/O devices 614 may be coupled to first bus 616, along with a bus bridge 618 which couples first bus 616 to a second bus 620. In one implementation, second bus 620 may be a low pin count (LPC) bus. Various devices may be coupled to second bus 620 including, for example, a keyboard and/or mouse 622, communication devices 627 and a storage unit 628 such as a disk drive or other mass storage device which may include instructions/code and data 630, in one implementation. Further, an audio I/O 624 may be coupled to second bus 620. Note that other architectures are possible. For example, instead of the point-to-point architecture of FIG. 6, a system may implement a multi-drop bus or other such architecture.

Figure 7:
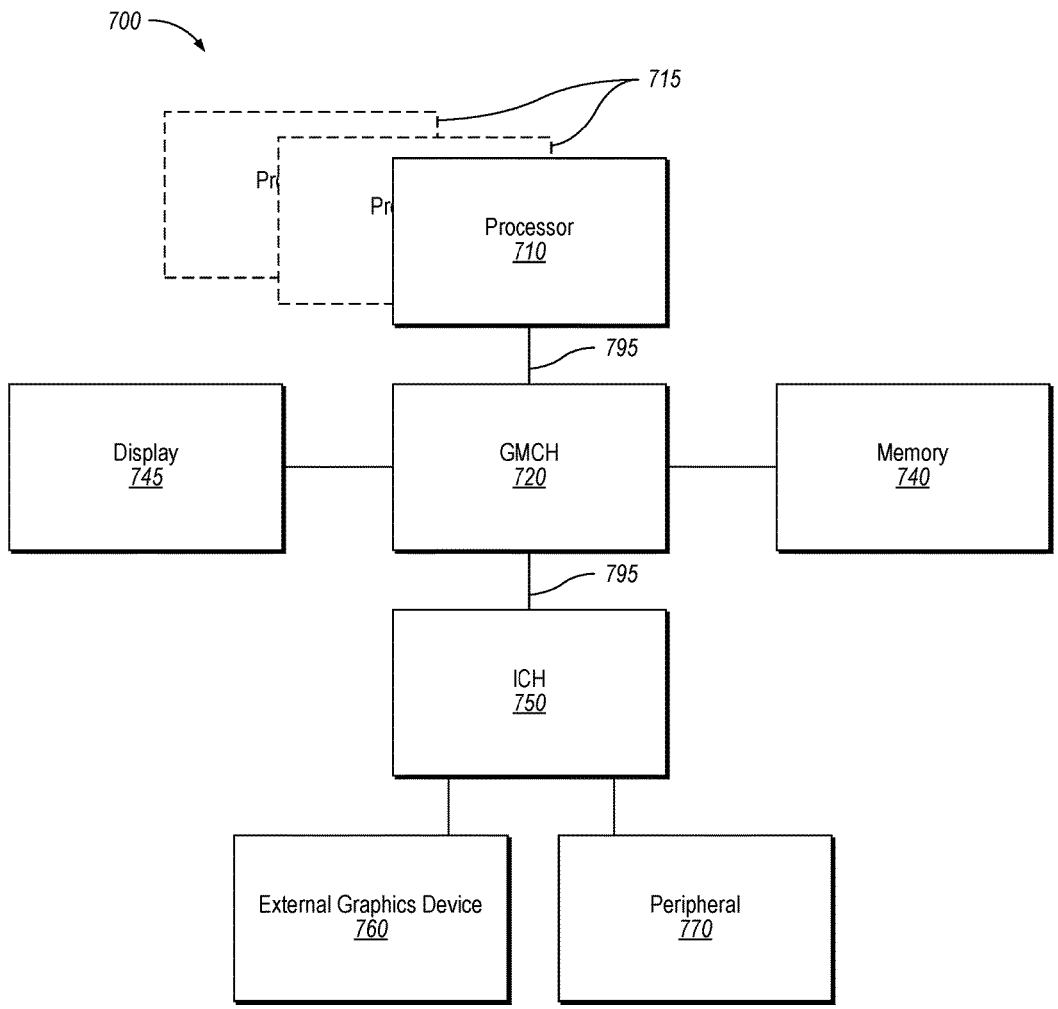
FIG. 7 is a block diagram of a system in which an implementation of the disclosure may operate.

Referring now to FIG. 7, shown is a block diagram of a system 700 in which one implementation of the disclosure may operate. The system 700 may include one or more processors 710, 715, which are coupled to graphics memory controller hub (GMCH) 720. The optional nature of additional processors 715 is denoted in FIG. 7 with broken lines. In one implementation, processors 710, 715 implement hybrid cores according to implementations of the disclosure.

Each processor 710, 715 may be some version of the circuit, integrated circuit, processor, and/or silicon integrated circuit as described above. However, it should be noted that it is unlikely that integrated graphics logic and integrated memory control units would exist in the processors 710, 715. FIG. 7 illustrates that the GMCH 720 may be coupled to a memory 740 that may be, for example, a dynamic random access memory (DRAM). The DRAM may, for at least one implementation, be associated with a non-volatile cache.

The GMCH 720 may be a chipset, or a portion of a chipset. The GMCH 720 may communicate with the processor(s) 710, 715 and control interaction between the processor(s) 710, 715 and memory 740. The GMCH 720 may also act as an accelerated bus interface between the processor(s) 710, 715 and other elements of the system 700. For at least one implementation, the GMCH 720 communicates with the processor(s) 710, 715 via a multi-drop bus, such as a frontside bus (FSB) 795.

Furthermore, GMCH 720 is coupled to a display 745 (such as a flat panel or touchscreen display). GMCH 720 may include an integrated graphics accelerator. GMCH 720 is further coupled to an input/output (I/O) controller hub (ICH) 750, which may be used to couple various peripheral devices to system 700. Shown for example in the implementation of FIG. 7 is an external graphics device 760, which may be a discrete graphics device, coupled to ICH 750, along with another peripheral device 770.

Alternatively, additional or different processors may also be present in the system 700. For example, additional processor(s) 715 may include additional processors(s) that are the same as processor 710, additional processor(s) that are heterogeneous or asymmetric to processor 710, accelerators (such as, e.g., graphics accelerators or digital signal processing (DSP) units), field programmable gate arrays, or any other processor. There can be a variety of differences between the processor(s) 710, 715 in terms of a spectrum of metrics of merit including architectural, micro-architectural, thermal, power consumption characteristics, and the like. These differences may effectively manifest themselves as asymmetry and heterogeneity amongst the processors 710, 715. For at least one implementation, the various processors 710, 715 may reside in the same die package.

Figure 8:
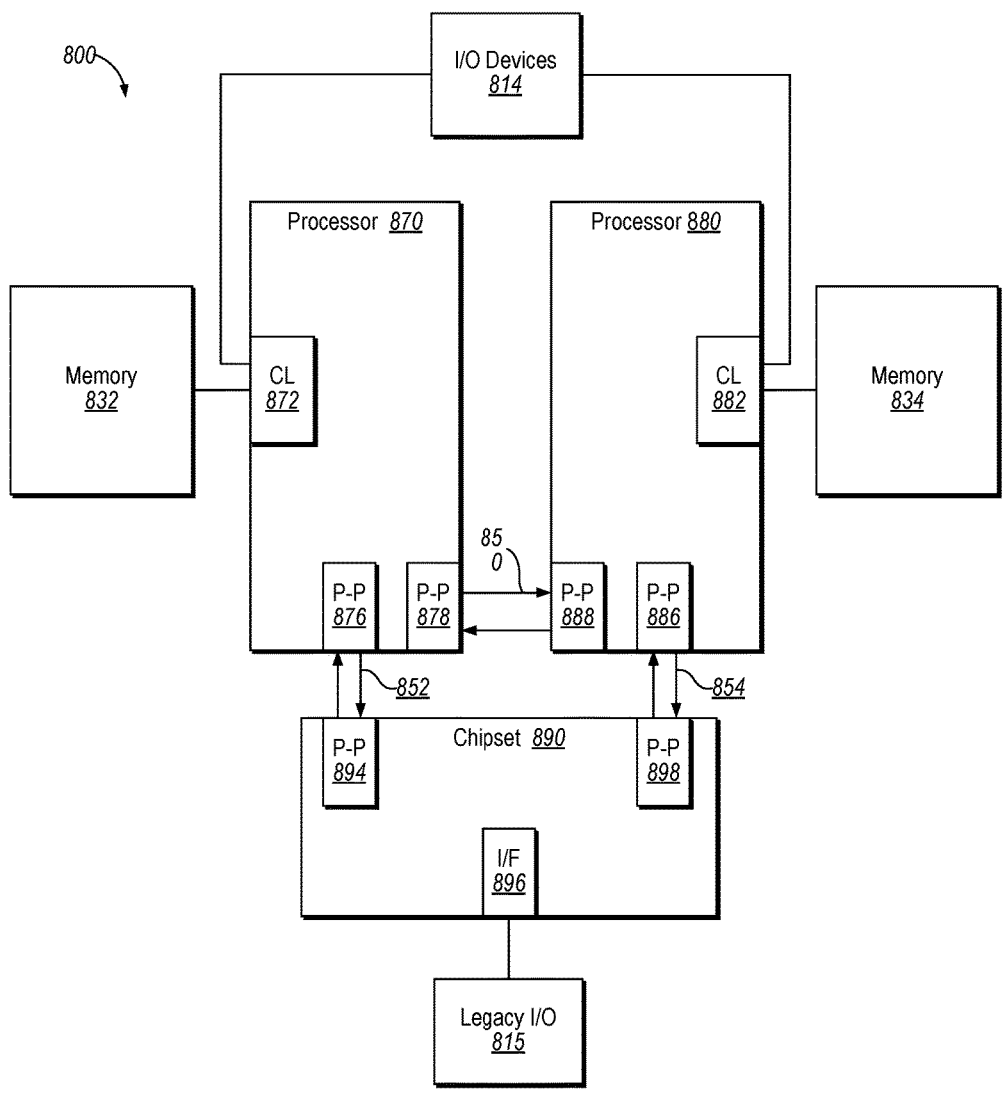
FIG. 8 is a block diagram of a system in which an implementation of the disclosure may operate.

Referring now to FIG. 8, shown is a block diagram of a system 800 in which an implementation of the disclosure may operate. FIG. 8 illustrates processors 870, 880. In one implementation, processors 870, 880 may implement hybrid cores as described above. Processors 870, 880 may include integrated memory and I/O control logic ("CL") 872 and 882, respectively and intercommunicate with each other via point-to-point interconnect 850 between point-to-point (P-P) interfaces 878 and 888 respectively. Processors 870, 880 each communicate with chipset 890 via point-to-point interconnects 852 and 854 through the respective P-P interfaces 876 to 894 and 886 to 898 as shown. For at least one implementation, the CL 872, 882 may include integrated memory controller units. CLs 872, 882 may include I/O control logic. As depicted, memories 832, 834 coupled to CLs 872, 882 and I/O devices 814 are also coupled to the control logic 872, 882. Legacy I/O devices 815 are coupled to the chipset 890 via interface 896.

Figure 9:
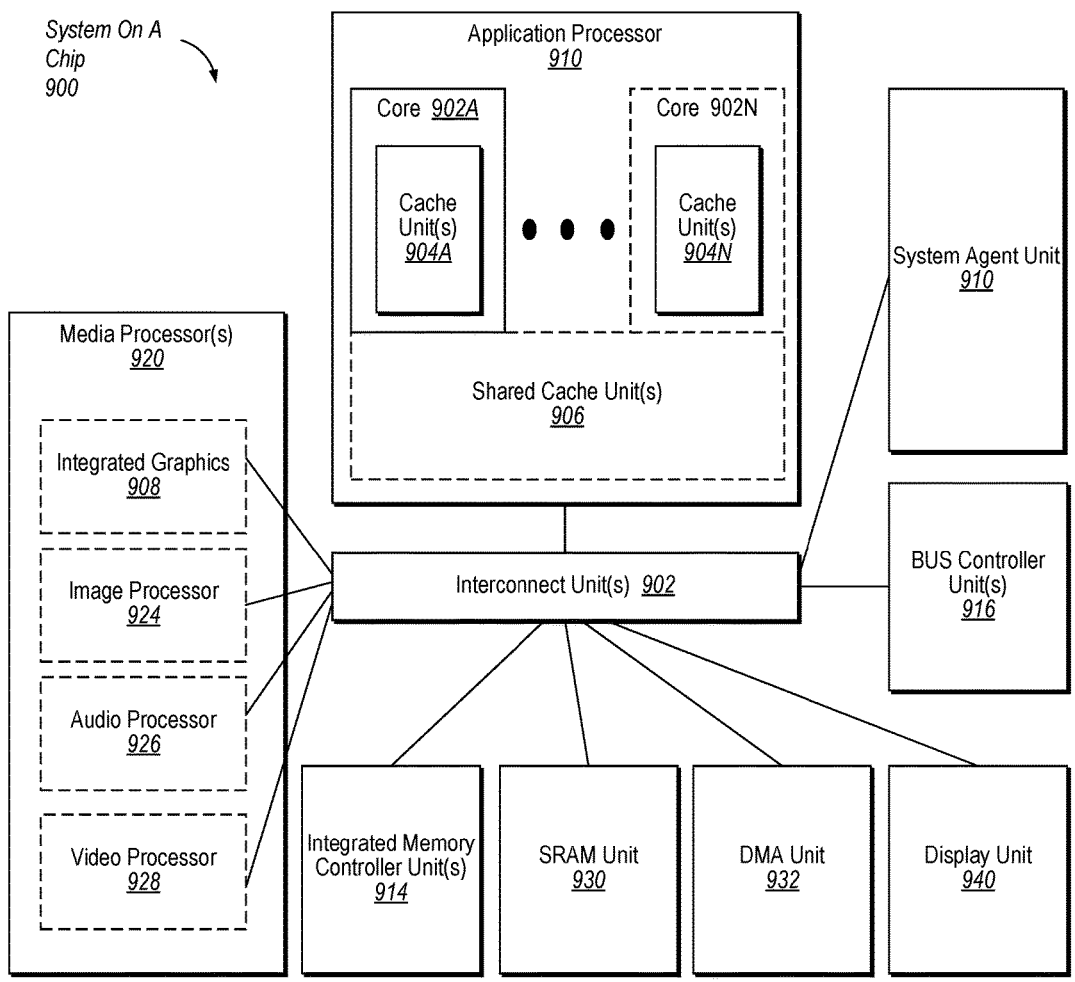
FIG. 9 is a block diagram of a System-on-a-Chip (SoC) in accordance with an implementation of the disclosure.

Implementations may be implemented in many different system types. FIG. 9 is a block diagram of a SoC 900 in accordance with an implementation of the disclosure. Dashed lined boxes are optional features on more advanced SoCs. In FIG. 9, an interconnect unit(s) 912 is coupled to: an application processor 920 which includes a set of one or more cores 902A-N and shared cache unit(s) 906; a system agent unit 910; a bus controller unit(s) 916; an integrated memory controller unit(s) 914; a set or one or more media processors 918 which may include integrated graphics logic 908, an image processor 924 for providing still and/or video camera functionality, an audio processor 926 for providing hardware audio acceleration, and a video processor 928 for providing video encode/decode acceleration; an static random access memory (SRAM) unit 930; a direct memory access (DMA) unit 932; and a display unit 940 for coupling to one or more external displays. In one implementation, a memory module may be included in the integrated memory controller unit(s) 914. In another implementation, the memory module may be included in one or more other components of the SoC 900 that may be used to access and/or control a memory. The application processor 920 may include a store address predictor for implementing hybrid cores as described in implementations herein.

The memory hierarchy includes one or more levels of cache within the cores, a set or one or more shared cache units 906, and external memory (not shown) coupled to the set of integrated memory controller units 914. The set of shared cache units 906 may include one or more mid-level caches, such as level 2 (L2), level 3 (L3), level 4 (L4), or other levels of cache, a last level cache (LLC), and/or combinations thereof.

In some implementations, one or more of the cores 902A-N are capable of multi-threading. The system agent 910 includes those components coordinating and operating cores 902A-N. The system agent unit 910 may include for example a power control unit (PCU) and a display unit. The PCU may be or include logic and components needed for regulating the power state of the cores 902A-N and the integrated graphics logic 908. The display unit is for driving one or more externally connected displays.

The cores 902A-N may be homogenous or heterogeneous in terms of architecture and/or instruction set. For example, some of the cores 902A-N may be in order while others are out-of-order. As another example, two or more of the cores 902A-N may be capable of execution the same instruction set, while others may be capable of executing only a subset of that instruction set or a different instruction set.

The application processor 920 may be a general-purpose processor, such as a Core™ i3, i5, i7, 2 Duo and Quad, Xeon™, Itanium™, Atom™ or Quark™ processor, which are available from Intel™ Corporation, of Santa Clara, Calif. Alternatively, the application processor 920 may be from another company, such as ARM Holdings™, Ltd, MIPS™, etc. The application processor 920 may be a special-purpose processor, such as, for example, a network or communication processor, compression engine, graphics processor, co-processor, embedded processor, or the like. The application processor 920 may be implemented on one or more chips. The application processor 920 may be a part of and/or may be implemented on one or more substrates using any of a number of process technologies, such as, for example, BiCMOS, CMOS, or NMOS.

Figure 10:
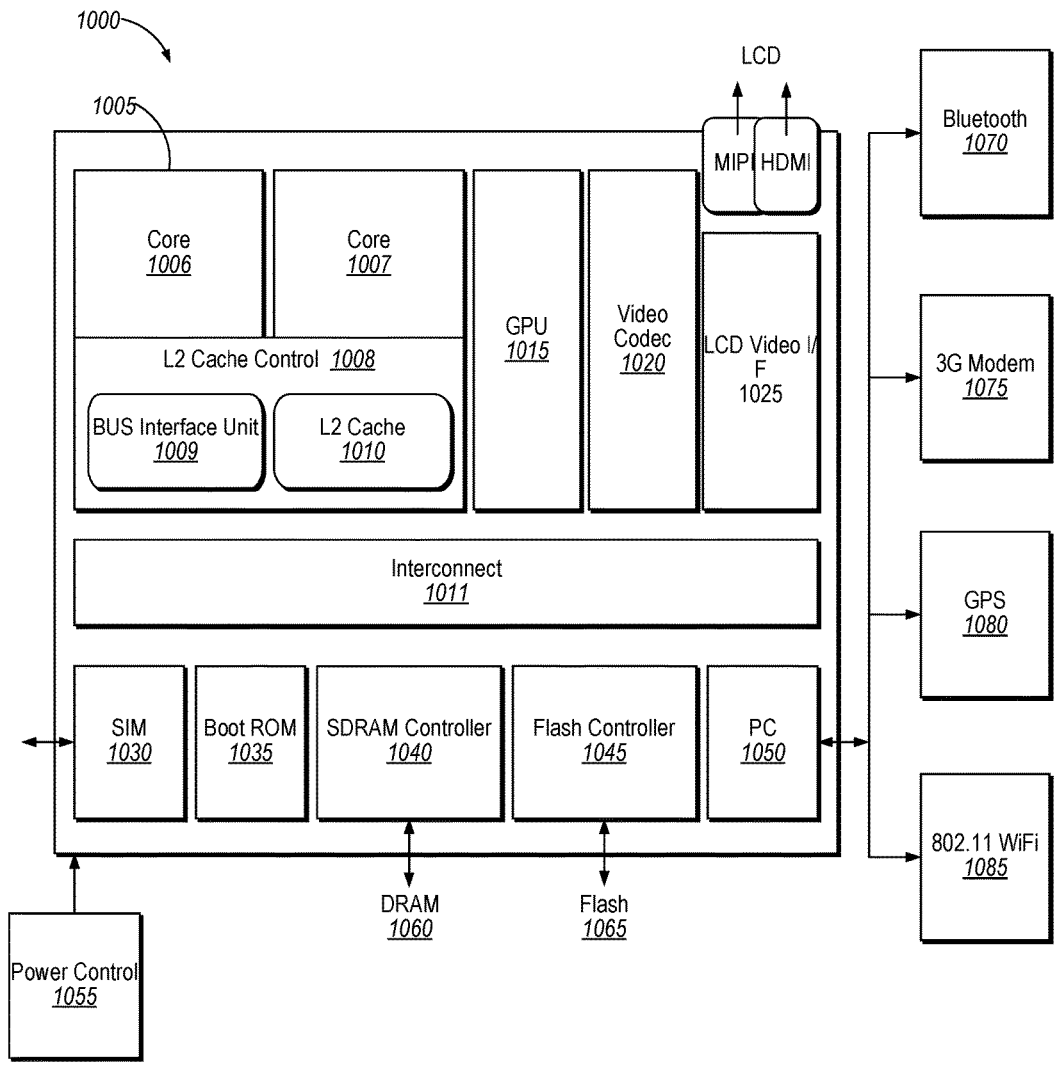
FIG. 10 is a block diagram of an implementation of an SoC design in accordance with the disclosure.

FIG. 10 is a block diagram of an implementation of a system on-chip (SoC) design in accordance with the disclosure. As a specific illustrative example, SoC 1000 is included in user equipment (UE). In one implementation, UE refers to any device to be used by an end-user to communicate, such as a hand-held phone, smartphone, tablet, ultra-thin notebook, notebook with broadband adapter, or any other similar communication device. Often a UE connects to a base station or node, which potentially corresponds in nature to a mobile station (MS) in a GSM network.

Here, SOC 1000 includes 2 cores—1006 and 1007. Cores 1006 and 1007 may conform to an Instruction Set Architecture, such as an Intel® Architecture Core™-based processor, an Advanced Micro Devices, Inc. (AMD) processor, a MIPS-based processor, an ARM-based processor design, or a customer thereof, as well as their licensees or adopters. Cores 1006 and 1007 are coupled to cache control 1008 that is associated with bus interface unit 1009 and L2 cache 1010 to communicate with other parts of system 1000. Interconnect 1010 includes an on-chip interconnect, such as an IOSF, AMBA, or other interconnect discussed above, which potentially implements one or more aspects of the described disclosure. In one implementation, cores 1006, 1007 may implement hybrid cores as described in implementations herein.

Interconnect 1010 provides communication channels to the other components, such as a Subscriber Identity Module (SIM) 1030 to interface with a SIM card, a boot ROM 1035 to hold boot code for execution by cores 1006 and 1007 to initialize and boot SoC 1000, a SDRAM controller 1040 to interface with external memory (e.g. DRAM 1060), a flash controller 1045 to interface with non-volatile memory (e.g. Flash 1065), a peripheral control 1050 (e.g. Serial Peripheral Interface) to interface with peripherals, video codecs 1020 and Video interface 1025 to display and receive input (e.g. touch enabled input), GPU 1015 to perform graphics related computations, etc. Any of these interfaces may incorporate aspects of the disclosure described herein. In addition, the system 1000 illustrates peripherals for communication, such as a Bluetooth module 1070, 3G modem 1075, GPS 1080, and Wi-Fi 1085.

Figure 11:
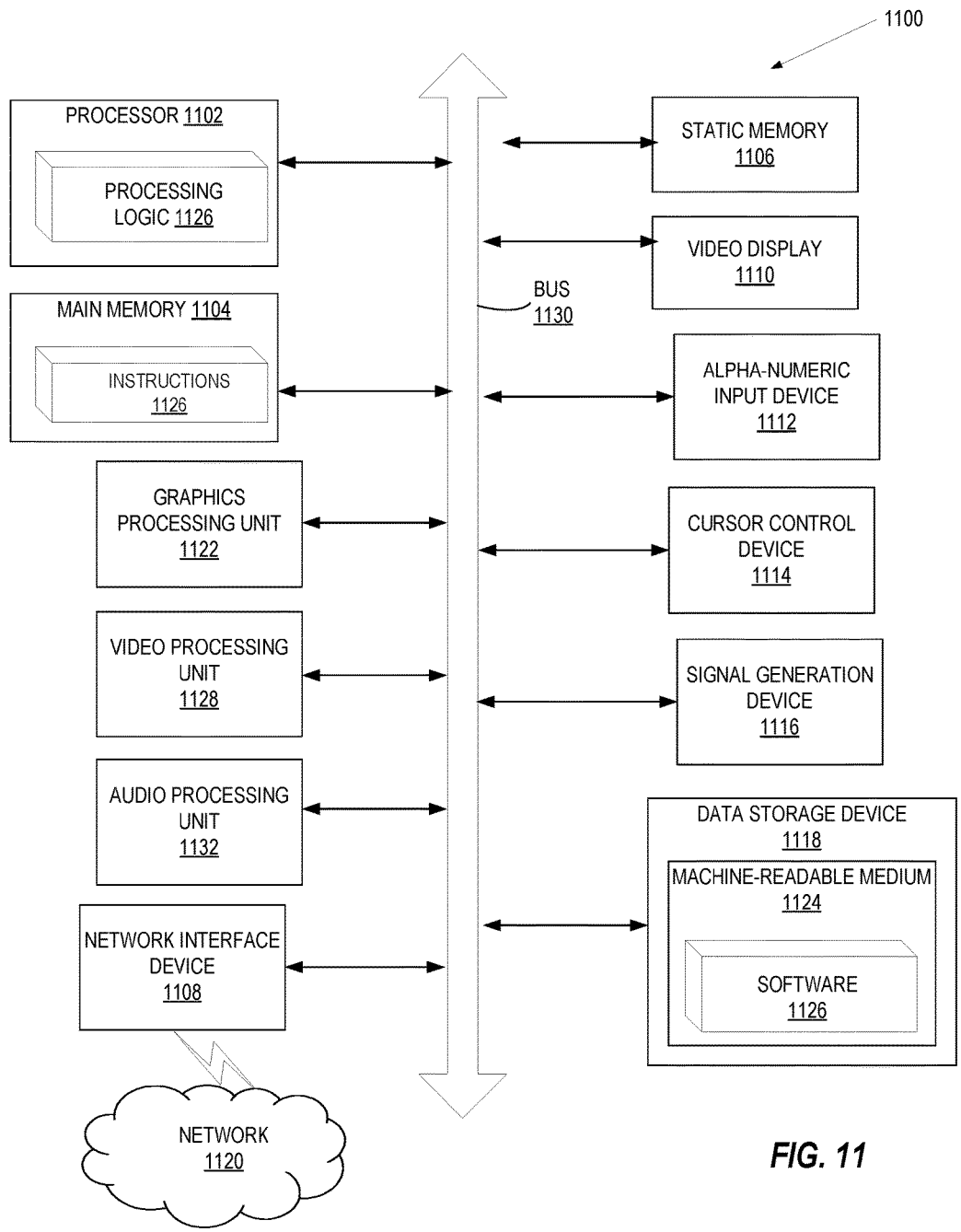
FIG. 11 illustrates a block diagram of one implementation of a computer system.

FIG. 11 illustrates a diagrammatic representation of a machine in the example form of a computer system 1100 within which a set of instructions, for causing the machine to perform any one or more of the methodologies discussed herein, may be executed. In alternative implementations, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The computer system 1100 includes a processing device 1102, a main memory 1104 (e.g., read-only memory (ROM), flash memory, dynamic random access memory (DRAM) (such as synchronous DRAM (SDRAM) or DRAM (RDRAM), etc.), a static memory 1106 (e.g., flash memory, static random access memory (SRAM), etc.), and a data storage device 1118, which communicate with each other via a bus 1130.

Processing device 1102 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 1102 may also be one or more special-purpose processing devices such as an application specific integrated circuit (ASIC), a field programmable gate array (FPGA), a digital signal processor (DSP), network processor, or the like. In one implementation, processing device 1102 may include one or processing cores. The processing device 1102 is configured to execute the processing logic 1126 for performing the operations and steps discussed herein. In one implementation, processing device 1102 is the same as processor architecture 100 described with respect to FIG. 1 as described herein with implementations of the disclosure.

The computer system 1100 may further include a network interface device 1108 communicably coupled to a network 1120. The computer system 1100 also may include a video display unit 1110 (e.g., a liquid crystal display (LCD) or a cathode ray tube (CRT)), an alphanumeric input device 1112 (e.g., a keyboard), a cursor control device 1114 (e.g., a mouse), and a signal generation device 1116 (e.g., a speaker). Furthermore, computer system 1100 may include a graphics processing unit 1122, a video processing unit 1128, and an audio processing unit 1132.

The data storage device 1118 may include a machine-accessible storage medium 1124 on which is stored software 1126 implementing any one or more of the methodologies of functions described herein, such as implementing store address prediction for memory disambiguation as described above. The software 1126 may also reside, completely or at least partially, within the main memory 1104 as instructions 1126 and/or within the processing device 1102 as processing logic 1126 during execution thereof by the computer system 1100; the main memory 1104 and the processing device 1102 also constituting machine-accessible storage media.

The machine-readable storage medium 1124 may also be used to store instructions 1126 implementing store address prediction for hybrid cores such as described according to implementations of the disclosure. While the machine-accessible storage medium 1118 is shown in an example implementation to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the disclosure. The term "machine-accessible storage medium" shall accordingly be taken to include, but not be limited to, solid-state memories, and optical and magnetic media.

The following examples pertain to further implementations.

Example 1 is a processing device comprising a power management unit to receive a base clock (BCLK) frequency rate to be applied to the processing device; and determine, using a reference voltage/frequency curve, a voltage corresponding to the BCLK frequency rate, wherein the reference V/F curve is generated based on a reference BCLK frequency rate of the processing device.

In Example 2, the subject matter of Example 1 can optionally include wherein the power management unit to compare the BCLK frequency rate with the reference BCLK frequency rate of the processing device.

In Example 3, the subject matter of Examples 1-2 can optionally include wherein the power management unit to determine a difference between a value of the BCLK frequency rate with the reference BCLK frequency rate of the processing device.

In Example 4, the subject matter of Examples 1-3 can optionally include wherein upon determination that the difference is greater than a threshold, the power management unit to generate a new V/F curve based on the voltage corresponding to the BCLK frequency rate and the reference V/F curve.

In Example 5, the subject matter of Examples 1-4 can optionally include wherein the power management unit to interpolate a plurality of BCLK frequencies of the processing device to generate a signal comprising a phase locked loop (PLL) ratio, wherein the PLL ratio is a ratio of each of a plurality of BCLK frequencies of the processing device with the BCLK frequency rate.

In Example 6, the subject matter of Examples 1-5 can optionally include wherein the PLL ratio is multiplied with the BCLK frequency rate to compute a BCLK frequency of the processing device corresponding to the BCLK frequency rate.

In Example 7, the subject matter of Examples 1-6 can optionally include wherein the voltage is determined at the PLL ratio corresponding to the BCLK frequency.

Example 8 is a system-on-a chip (SoC) comprising a memory; and a processing device communicably coupled to the memory, comprising a power management unit to receive a base clock (BCLK) frequency rate to be applied to the processing device; and determine, using a reference voltage/frequency curve, a voltage corresponding to the BCLK frequency rate, wherein the reference V/F curve is generated based on a reference BCLK frequency rate of the processing device.

In Example 9, the subject matter of Example 8 can optionally include wherein the power management unit to compare the BCLK frequency rate with the reference BCLK frequency rate of the processing device.

In Example 10, the subject matter of Examples 8-9 can optionally include wherein the power management unit to determine a difference between a value of the BCLK frequency rate with the reference BCLK frequency rate of the processing device.

In Example 11, the subject matter of Examples 8-10 can optionally include wherein upon determination that the difference is greater than a threshold, the power management unit to generate a new V/F curve based on the voltage corresponding to the BCLK frequency rate and the reference V/F curve.

In Example 12, the subject matter of Examples 8-11 can optionally include wherein the power management unit to interpolate a plurality of BCLK frequencies of the processing device to generate a signal comprising a phase locked loop (PLL) ratio, wherein the PLL ratio is a ratio of each of a plurality of BCLK frequencies of the processing device with the BCLK frequency rate.

In Example 13, the subject matter of Examples 8-12 can optionally include wherein the PLL ratio is multiplied with the BCLK frequency rate to compute a BCLK frequency of the processing device corresponding to the BCLK frequency rate.

In Example 14, the subject matter of Examples 8-13 can optionally include wherein the voltage is determined at the PLL ratio corresponding to a BCLK frequency among the plurality of BCLK frequencies of the processing device.

Example 15 is a method comprising receiving a base clock (BCLK) frequency rate to be applied to the processing device; and determining, using a reference voltage/frequency curve, a voltage corresponding to the BCLK frequency rate, wherein the reference V/F curve is generated based on a reference BCLK frequency rate of the processing device.

In Example 16, the subject matter of Example 15 can optionally include further comprising comparing the BCLK frequency rate with the reference BCLK frequency rate of the processing device.

In Example 17, the subject matter of Examples 15-16 can optionally include further comprising determining a difference between a value of the BCLK frequency rate with the reference BCLK frequency rate of the processing device.

In Example 18, the subject matter of Examples 15-17 can optionally include further comprising upon determination that the difference is greater a threshold, generating a new V/F curve based on the voltage corresponding to the BCLK frequency rate and the reference V/F curve.

In Example 19, the subject matter of Examples 15-18 can optionally include further comprising interpolating a plurality of BCLK frequencies of the processing device to generate a signal comprising a phase locked loop (PLL) ratio, wherein the PLL ratio is a ratio of each of a plurality of BCLK frequencies of the processing device with the BCLK frequency rate.

In Example 20, the subject matter of Examples 15-19 can optionally include wherein the voltage is determined at the PLL ratio corresponding to a BCLK frequency among the plurality of BCLK frequencies of the processing device.

Example 21 is a non-transitory machine-readable storage medium including instructions that, when accessed by a processing device, cause the processing device to perform operations comprising receiving a base clock (BCLK) frequency rate to be applied to the processing device; and determining, using a reference voltage/frequency curve, a voltage corresponding to the BCLK frequency rate, wherein the reference V/F curve is generated based on a reference BCLK frequency rate of the processing device.

In Example 22, the subject matter of Example 21 can optionally include wherein the operations further comprising comparing the BCLK frequency rate with the reference BCLK frequency rate of the processing device In Example 23, the subject matter of Examples 21-22 can optionally include wherein the operations further comprising generating a new V/F curve based on the voltage corresponding to the BCLK frequency rate and the reference V/F curve.

In Example 24, the subject matter of Examples 21-23 can optionally include wherein the operations further comprising interpolating a plurality of BCLK frequencies of the processing device to generate a signal comprising a phase locked loop (PLL) ratio, wherein the PLL ratio is a ratio of each of a plurality of BCLK frequencies of the processing device with the BCLK frequency rate.

In Example 25, the subject matter of Examples 21-24 can optionally include wherein the voltage is determined at the PLL ratio corresponding to a BCLK frequency among the plurality of BCLK frequencies of the processing device.

Various implementations may have different combinations of the structural features described above. For instance, all optional features of the SOC described above may also be implemented with respect to a processor described herein and specifics in the examples may be used anywhere in one or more implementations.

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of implementations of the disclosure.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one implementation, refers to the hardware, which is specifically configured to recognize and/or execute the code to be held on a non-transitory medium. Furthermore, in another implementation, use of a module refers to the non-transitory medium including the code, which is specifically adapted to be executed by the microcontroller to perform predetermined operations. And as can be inferred, in yet another implementation, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one implementation, use of the term logic includes hardware, such as transistors, registers, or other hardware, such as programmable logic devices.

Use of the phrase 'configured to,' in one implementation, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'to,' 'capable of/to,' and or 'operable to,' in one implementation, refers to some apparatus, logic, hardware, and/or element designed in such a way to enable use of the apparatus, logic, hardware, and/or element in a specified manner. Note as above that use of to, capable to, or operable to, in one implementation, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one implementation, a storage cell, such as a transistor or flash cell, may be capable of holding a single logical value or multiple logical values. However, other representations of values in computer systems have been used. For example the decimal number ten may also be represented as a binary value of 910 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one implementation, refer to a default and an updated value or state, respectively. For example, a default value potentially includes a high logical value, i.e. reset, while an updated value potentially includes a low logical value, i.e. set. Note that any combination of values may be utilized to represent any number of states.

The implementations of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform implementations of the disclosure may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

Reference throughout this specification to "one implementation" or "an implementation" means that a particular feature, structure, or characteristic described in connection with the implementation is included in at least one implementation of the disclosure. Thus, the appearances of the phrases "in one implementation" or "in an implementation" in various places throughout this specification are not necessarily all referring to the same implementation. Furthermore, the particular features, structures, or characteristics may be combined in any suitable manner in one or more implementations.

In the foregoing specification, a detailed description has been given with reference to specific exemplary implementations. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of implementation and other exemplarily language does not necessarily refer to the same implementation or the same example, but may refer to different and distinct implementations, as well as potentially the same implementation.

What is claimed is:

1. A processing device, comprising:
power management circuitry to:
receive a base clock (BCLK) frequency rate to be applied to the processing device;
determine, using a first reference voltage/frequency curve, a voltage to operate the processing device corresponding to the BCLK frequency rate, wherein the reference V/F curve is generated based on a reference BCLK frequency rate of the processing device;
determine a difference between a value of the BCLK frequency rate with the reference BCLK frequency rate of the processing device;
in response to a determination that the difference is greater than a threshold, generate a second reference voltage/frequency curve based on the voltage corresponding to the BCLK frequency rate and the reference V/F curve; and
determine, using the second reference voltage/frequency curve, a voltage to operate the processing device corresponding to the BCLK frequency rate.

2. The processing device of claim 1 wherein the power management circuitry to interpolate a plurality of BCLK frequencies of the processing device to generate a signal comprising a phase locked loop (PLL) ratio, wherein the PLL ratio is a ratio of each of a plurality of BCLK frequencies of the processing device with the BCLK frequency rate.

3. The processing device of claim 2, wherein the PLL ratio is multiplied with the BCLK frequency rate to compute a BCLK frequency of the processing device corresponding to the BCLK frequency rate.

4. The processing device of claim 3, wherein the voltage is determined at the PLL ratio corresponding to the BCLK frequency.

5. A system-on-a chip (SoC) comprising:
a memory; and
a processing device communicably coupled to the memory, wherein the processing device comprises:
power management circuitry to:
receive a base clock (BCLK) frequency rate to be applied to the processing device;
determine, using a first reference voltage/frequency curve, a voltage to operate the processing device corresponding to the BCLK frequency rate, wherein the reference V/F curve is generated based on a reference BCLK frequency rate of the processing device;
determine a difference between a value of the BCLK frequency rate with the reference BCLK frequency rate of the processing device;
in response to a determination that the difference is greater than a threshold, generate a second reference voltage/frequency curve based on the voltage corresponding to the BCLK frequency rate and the reference V/F curve; and
determine, using the second reference voltage/frequency curve, a voltage to operate the processing device corresponding to the BCLK frequency rate.

6. The SoC of claim 5 wherein the power management circuitry to interpolate a plurality of BCLK frequencies of the processing device to generate a signal comprising a phase locked loop (PLL) ratio, wherein the PLL ratio is a ratio of each of a plurality of BCLK frequencies of the processing device with the BCLK frequency rate.

7. The SoC of claim 6 wherein the PLL ratio is multiplied with the BCLK frequency rate to compute a BCLK frequency of the processing device corresponding to the BCLK frequency rate.

8. The SoC of claim 6, wherein the voltage is determined at the PLL ratio corresponding to a BCLK frequency among the plurality of BCLK frequencies of the processing device.

9. A method comprising:
receiving a base clock (BCLK) frequency rate to be applied to the processing device;
determining, using a first reference voltage/frequency curve, a voltage to operate the processing device corresponding to the BCLK frequency rate, wherein the reference V/F curve is generated based on a reference BCLK frequency rate of the processing device;
determining a difference between a value of the BCLK frequency rate with the reference BCLK frequency rate of the processing device;
in response to determining the difference is greater than a threshold, generating a second reference voltage/frequency curve based on the voltage corresponding to the BCLK frequency rate and the reference V/F curve; and
determining, using the second reference voltage/frequency curve, a voltage to operate the processing device corresponding to the BCLK frequency rate.

10. The method of claim 9 further comprising interpolating a plurality of BCLK frequencies of the processing device to generate a signal comprising a phase locked loop (PLL) ratio, wherein the PLL ratio is a ratio of each of a plurality of BCLK frequencies of the processing device with the BCLK frequency rate.

11. The method of claim 10, wherein the voltage is determined at the PLL ratio corresponding to a BCLK frequency among the plurality of BCLK frequencies of the processing device.

12. A non-transitory machine-readable storage medium including instructions that, when accessed by a processing device, cause the processing device to perform operations comprising:
receiving a base clock (BCLK) frequency rate to be applied to the processing device;
determining, using a first reference voltage/frequency curve, a voltage to operate the processing device corresponding to the BCLK frequency rate, wherein the reference V/F curve is generated based on a reference BCLK frequency rate of the processing device;
determining a difference between a value of the BCLK frequency rate with the reference BCLK frequency rate of the processing device;
in response to determining the difference is greater than a threshold, generating a second reference voltage/frequency curve based on the voltage corresponding to the BCLK frequency rate and the reference V/F curve; and determining, using the second reference voltage/frequency curve, a voltage to operate the processing device corresponding to the BCLK frequency rate.

13. The non-transitory machine-readable storage medium of claim 12, wherein the operations further comprising interpolating a plurality of BCLK frequencies of the processing device to generate a signal comprising a phase locked loop (PLL) ratio, wherein the PLL ratio is a ratio of each of a plurality of BCLK frequencies of the processing device with the BCLK frequency rate.

14. The non-transitory machine-readable storage medium of claim 13, wherein the voltage is determined at the PLL ratio corresponding to a BCLK frequency among the plurality of BCLK frequencies of the processing device.

* * * * *